(12) United States Patent
Chen et al.

(10) Patent No.: US 8,244,089 B2
(45) Date of Patent: Aug. 14, 2012

(54) DUST CAPS FOR FIBER OPTIC CONNECTORS

(75) Inventors: Simon Shen-Meng Chen, Palatine, IL (US); Eduardo Leon, Woodridge, IL (US)

(73) Assignee: Emerson Network Power, Energy Systems, North America, Inc., Warrenville, IL (US)

(\*) Notice: Subject to any disclaimer, the term of this patent is extended or adjusted under 35 U.S.C. 154(b) by 0 days.

(21) Appl. No.: 12/948,258

(22) Filed: Nov. 17, 2010

(65) Prior Publication Data

US 2011/0058775 A1 Mar. 10, 2011

Related U.S. Application Data

(63) Continuation-in-part of application No. 12/477,689, filed on Jun. 3, 2009.

(60) Provisional application No. 61/261,985, filed on Nov. 17, 2009.

(51) Int. Cl.
G02B 6/44 (2006.01)

(52) U.S. Cl. ...................................... 385/134

(58) Field of Classification Search .................. 385/134
See application file for complete search history.

(56) References Cited

U.S. PATENT DOCUMENTS

| | | | |
|---|---|---|---|
| 6,068,503 A | 5/2000 | Gerke et al. |
| 6,379,054 B2 | 4/2002 | Throckmorton et al. |
| 6,547,450 B2 | 4/2003 | Lampert |
| 6,983,095 B2 | 1/2006 | Reagan et al. |
| 7,103,255 B2 | 9/2006 | Reagan et al. |
| 7,146,089 B2 | 12/2006 | Reagan et al. |
| 7,164,840 B2 | 1/2007 | Hsieh |
| 7,167,628 B2 | 1/2007 | Beck |
| 7,171,102 B2 | 1/2007 | Reagan et al. |
| 7,186,038 B2 | 3/2007 | Hovland et al. |
| 7,190,874 B1 | 3/2007 | Barth et al. |
| 7,194,181 B2 | 3/2007 | Holmberg et al. |
| 7,198,409 B2 | 4/2007 | Smith et al. |
| 7,200,317 B2 | 4/2007 | Reagan et al. |
| 7,209,629 B2 | 4/2007 | Bianchi et al. |
| 7,218,827 B2 | 5/2007 | Vongseng et al. |
| 7,233,731 B2 | 6/2007 | Solheid et al. |
| 7,277,620 B2 | 10/2007 | Vongseng et al. |
| 7,295,747 B2 | 11/2007 | Solheid et al. |
| 7,352,945 B2 | 4/2008 | Holmberg et al. |
| 7,352,948 B2 | 4/2008 | Beck |
| 7,369,741 B2 | 5/2008 | Reagan et al. |
| 7,376,322 B2 | 5/2008 | Zimmel et al. |
| 7,394,964 B2 | 7/2008 | Tinucci et al. |
| 7,400,813 B2 | 7/2008 | Zimmel |
| 7,400,816 B2 | 7/2008 | Reagan et al. |

(Continued)

*Primary Examiner* — Eric Wong
(74) *Attorney, Agent, or Firm* — Harness, Dickey & Pierce, P.L.C.

(57) ABSTRACT

A dust cap for a fiber optic connector is disclosed. The fiber optic connector includes a connector body having a first end and second end opposite the first end, and a ferrule positioned at the first end of the connector body. The ferrule holds an optical fiber having an end face. The dust cap includes a housing defining a cavity for receiving the ferrule of the fiber optic connector and a retaining member coupled to the housing. The retaining member is structured to be disposed adjacent to the second end of the connector body when the ferrule is disposed within the cavity to inhibit removal of the fiber optic connector from the dust cap. Additionally, or alternatively, the dust cap may include a mounting member for releasably engaging a support structure.

20 Claims, 21 Drawing Sheets

U.S. PATENT DOCUMENTS

| | | |
|---|---|---|
| 7,407,330 B2 | 8/2008 | Smith et al. |
| 7,418,181 B2 | 8/2008 | Zimmel et al. |
| 7,457,503 B2 | 11/2008 | Solheid et al. |
| 7,471,869 B2 | 12/2008 | Reagan et al. |
| 7,481,585 B2 | 1/2009 | Scadden et al. |
| 7,490,994 B2 | 2/2009 | Scadden et al. |
| 7,515,805 B2 | 4/2009 | Vongseng et al. |
| 7,519,259 B2 | 4/2009 | Smith et al. |
| 7,556,437 B2 | 7/2009 | Droege |
| 7,565,053 B2 | 7/2009 | Zimmel et al. |
| 7,583,883 B2 | 9/2009 | Kowalczyk et al. |
| 7,623,749 B2 | 11/2009 | Reagan et al. |
| 7,720,344 B2 | 5/2010 | Tang et al. |
| 7,751,672 B2 | 7/2010 | Smith et al. |
| 7,756,383 B2 | 7/2010 | Beck |
| 7,809,234 B2 | 10/2010 | Smith et al. |
| 7,826,706 B2 | 11/2010 | Vongseng et al. |
| 7,841,775 B2 | 11/2010 | Smith et al. |
| 7,844,159 B2 | 11/2010 | Solheid et al. |
| 7,873,255 B2 | 1/2011 | Reagan et al. |
| 2008/0310795 A1* | 12/2008 | Parkman et al. ........ 385/60 |
| 2009/0016684 A1* | 1/2009 | Beck ........ 385/78 |

* cited by examiner

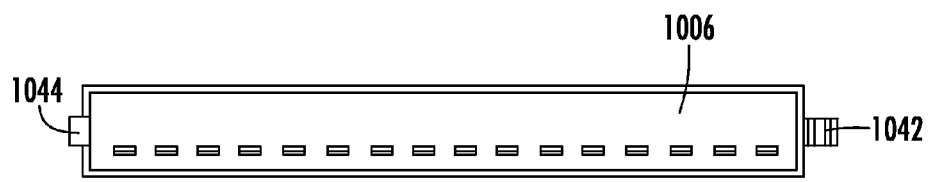
FIG. 34A
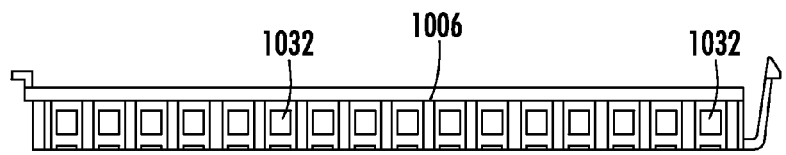
FIG. 34B
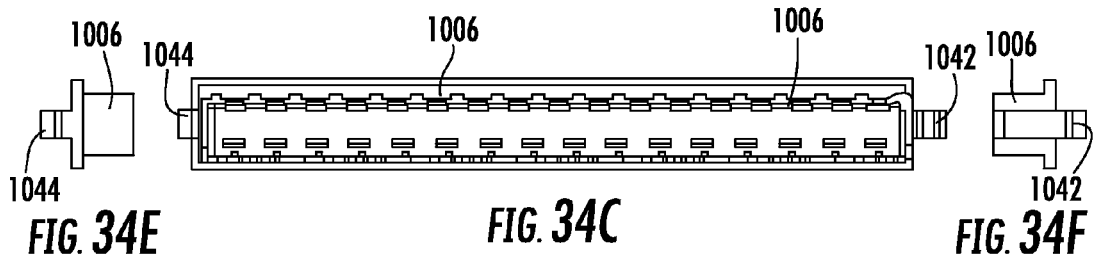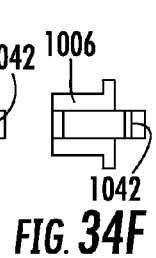
FIG. 34E    FIG. 34C    FIG. 34F
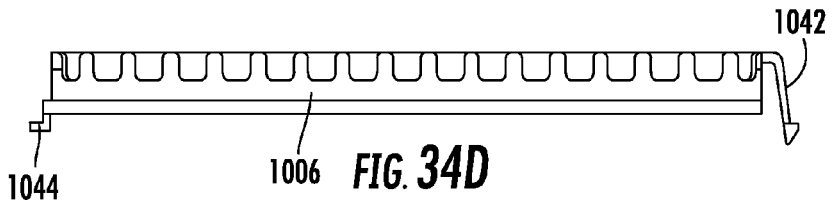
FIG. 34D

DUST CAPS FOR FIBER OPTIC CONNECTORS

CROSS-REFERENCE TO RELATED APPLICATIONS

This application is a continuation-in-part of U.S. patent application Ser. No. 12/477,689 filed on Jun. 3, 2009. This application claims the benefit of U.S. Provisional Application No. 61/261,985, filed on Nov. 17, 2009. The entire disclosures of each of the above applications are incorporated herein by reference.

FIELD

The present disclosure relates generally to dust caps for fiber optic connectors, and related methods and assemblies.

BACKGROUND

This section provides background information related to the present disclosure which is not necessarily prior art.

Fiber optic cables are increasingly used in telecommunication networks for transmitting voice, video and other data using light signals. Many fiber optic cables have a connector on one or both ends of the cable so the cable can be readily connected to another cable or fiber optic device (typically via an optical coupler, also called an optical adaptor).

Dust caps are commonly used with fiber optic connectors to protect the exposed end of an optical fiber in the connector from dust, debris, damage, etc. The fiber optic connectors include a ferrule for holding the optical fiber. The dust caps typically include a housing that engages the ferrule in the connector to releasably couple the dust cap to the ferrule. In this manner, each dust cap covers the end face of an optical fiber to protect it from damage. The dust caps may be removed from the ferrules before the connectors are coupled to another cable or fiber optic device.

SUMMARY

This section provides a general summary of the disclosure, and is not a comprehensive disclosure of its full scope or all of its features.

According to one aspect of the present disclosure, a dust cap for a fiber optic connector is disclosed. The fiber optic connector includes a connector body having a first end and a second end opposite the first end, and a ferrule positioned at the first end of the connector body. The dust cap includes a housing defining a cavity for receiving the ferrule of the fiber optic connector and a retaining member coupled to the housing. The retaining member is structured to be disposed adjacent to the second end of the connector body when the ferrule is disposed within the cavity to inhibit removal of the fiber optic connector from the dust cap.

According to another aspect of the present disclosure, a dust cap for a fiber optic connector is disclosed. The fiber optic connector includes a connector body having a first end and a second end and a ferrule positioned at the first end of the connector body. The dust cap includes a housing defining a cavity for receiving the ferrule of the fiber optic connector, a mounting member for releasably engaging a support structure, and a retaining member structured to inhibit removal of the fiber optic connector from the dust cap when the ferrule is disposed within the cavity.

According to yet another aspect of the present disclosure, a method of managing a fiber optic connector and a dust cap is disclosed. The fiber optic connector includes a connector body having a first end and a second end opposite the first end and a ferrule positioned at the first end of the connector body. The dust cap includes a housing defining a cavity and a retaining member coupled to the housing. The method includes deflecting the retaining member of the dust cap away from the second end of the connector body of the fiber optic connector and removing the ferrule of the fiber optic connector from the cavity of the dust cap.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-D are various views of a dust cap according to one example embodiment of the present disclosure.

Figure 3:
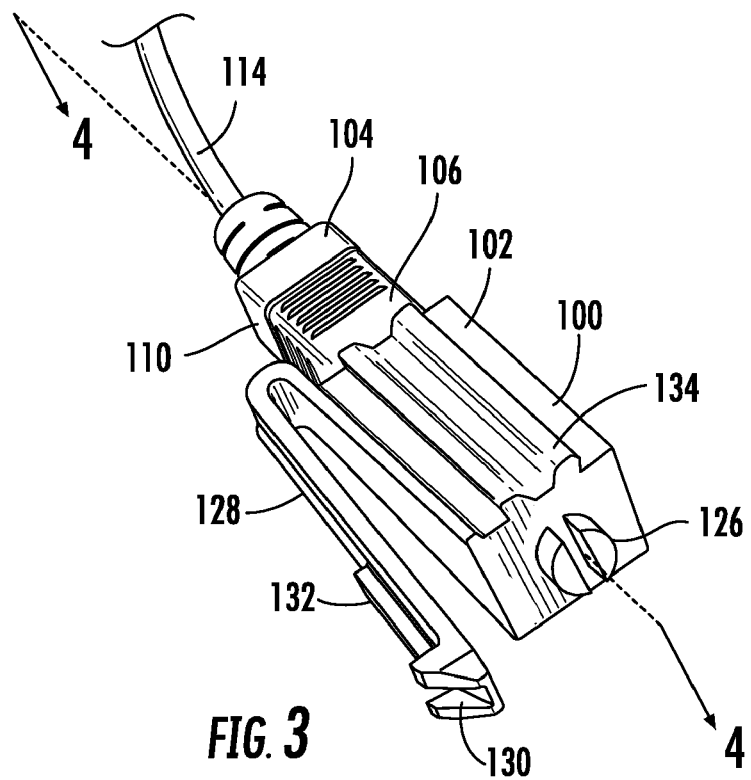
FIG. 3 is an assembled perspective view of the fiber optic assembly of FIG. 2.
Figure 5A:
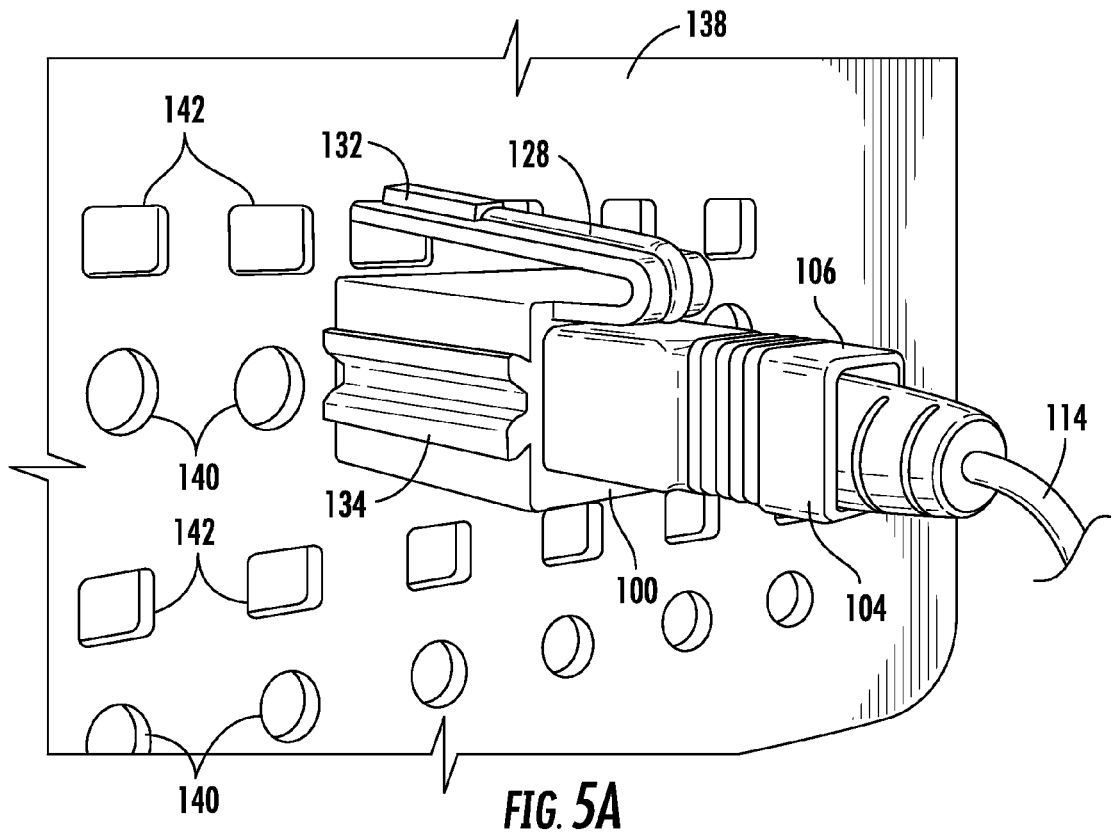
Figure 5B:
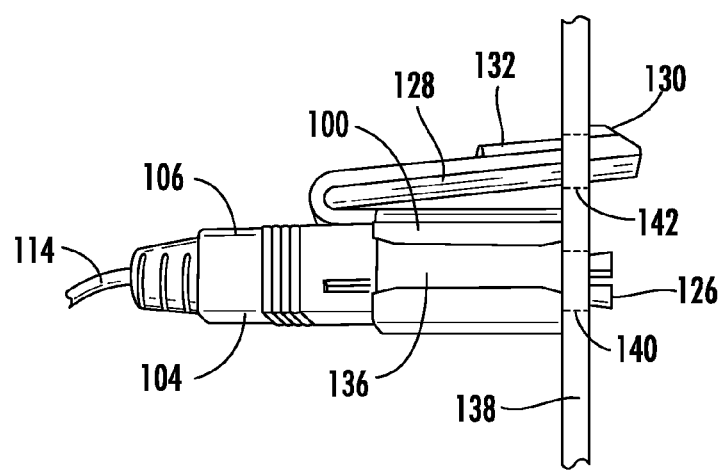

FIGS. 5A-B are views of the fiber optic assembly of FIG. 3 releasably coupled to a support structure.

Figure 6:
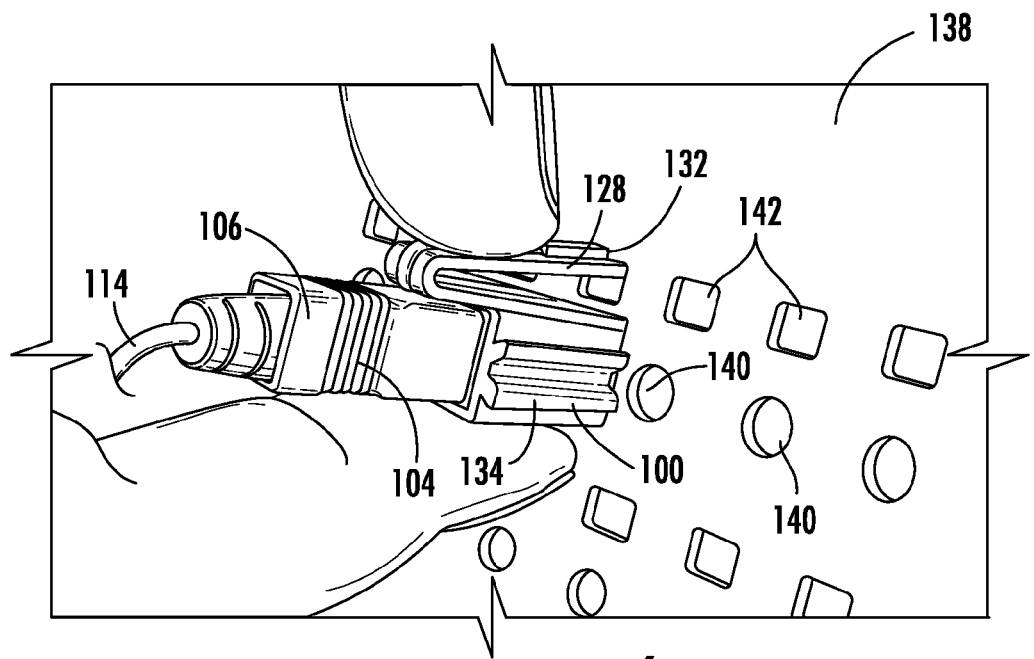

FIG. 6 is a perspective view of the fiber optic assembly of FIG. 3 as it is disengaged from a support structure.

Figure 7A:
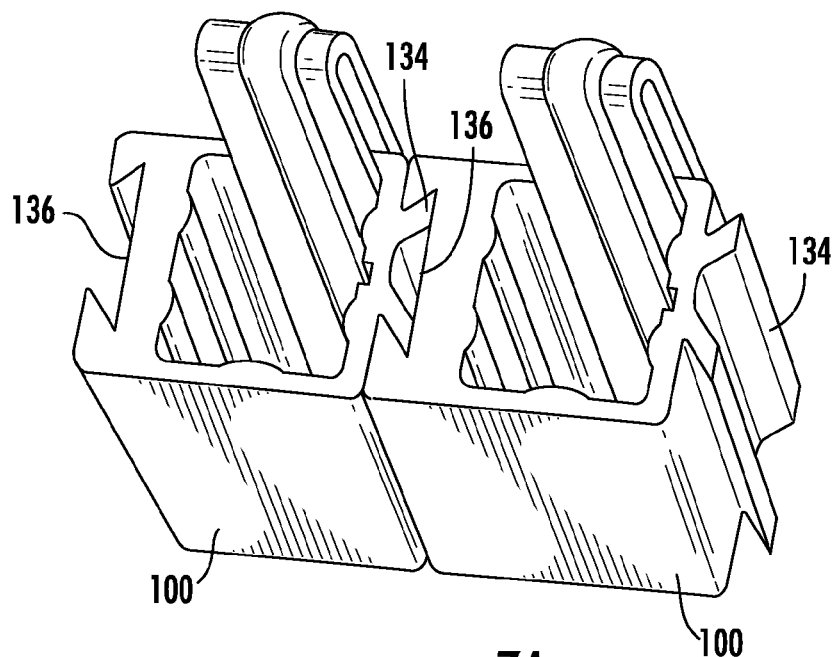

FIG. 7A is a perspective view of the dust cap of FIG. 1 coupled to an identical dust cap.

Figure 7B:
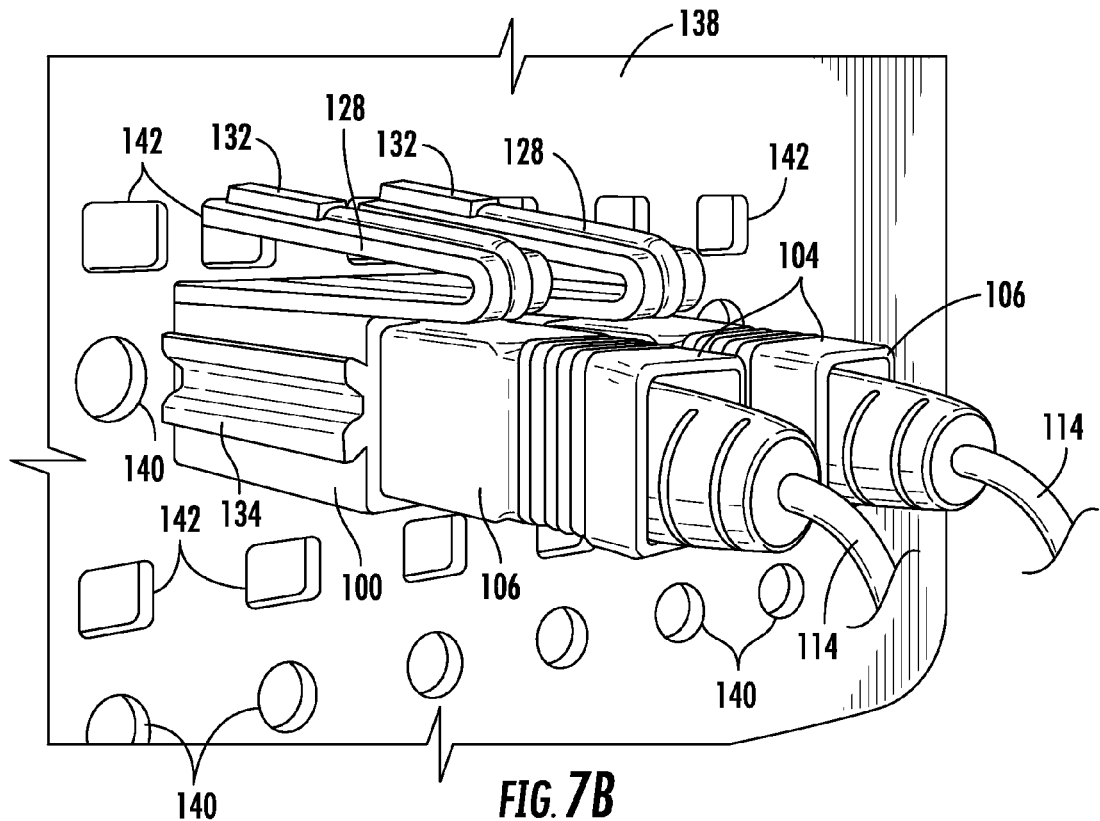

FIG. 7B is a perspective view of multiple fiber optic assemblies of FIG. 3 releasably coupled to a support structure and one another.

Figure 8:
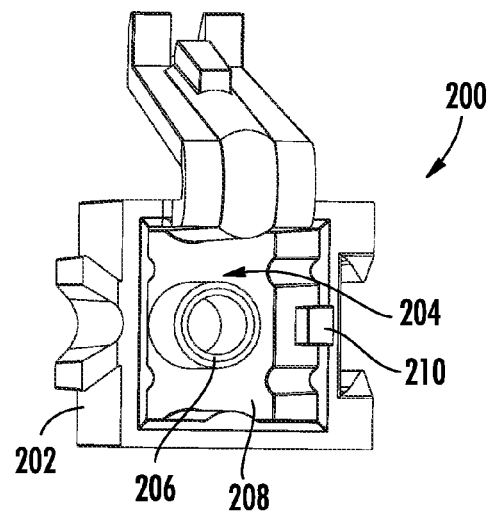

FIG. 8 is a perspective view of a dust cap according to another example embodiment of the present disclosure.

Figures 9A, 9B, 9C:
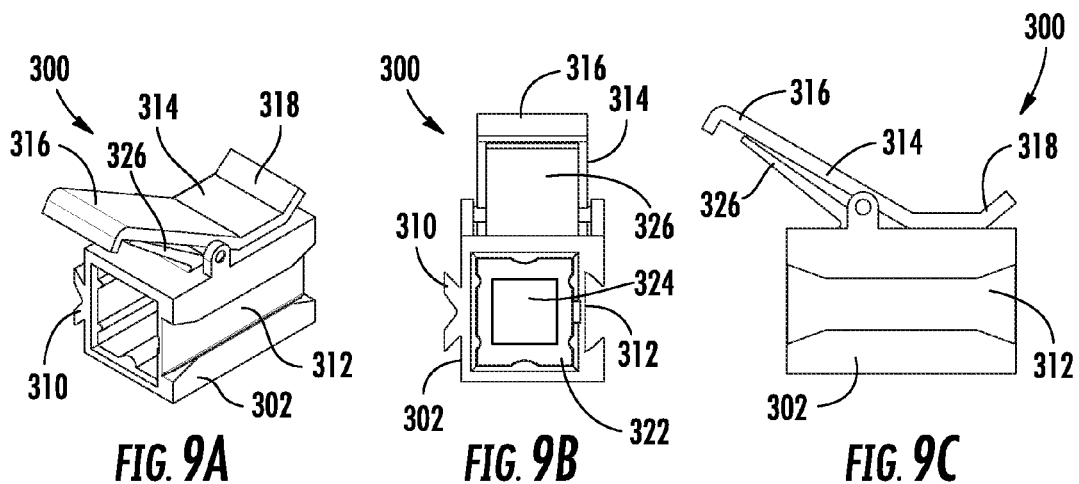

FIGS. 9A-C are views of a dust cap according to yet another example embodiment of the present disclosure.

Figure 10:
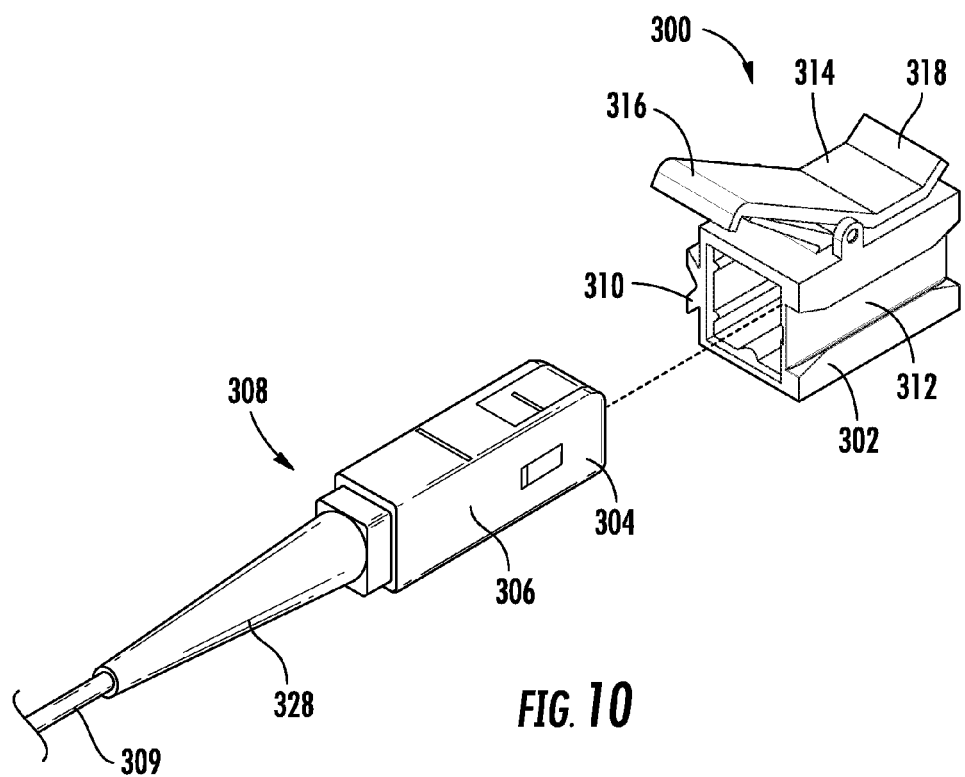

FIG. 10 is an exploded perspective view of a fiber optic assembly including the dust cap of FIG. 9.

Figure 11:
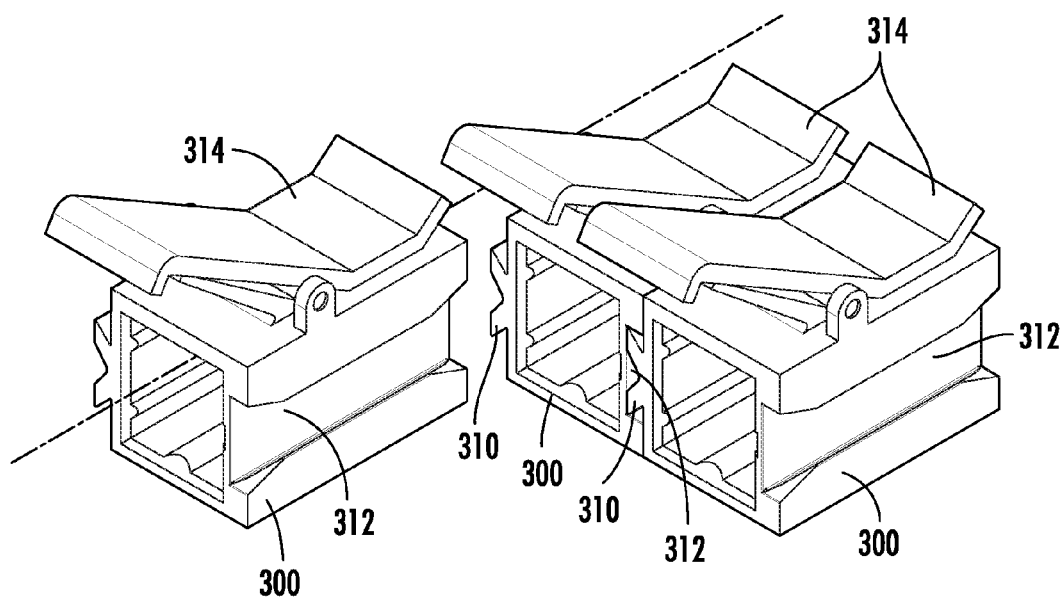

FIG. 11 is an exploded perspective view of the dust cap of FIG. 9 releasably coupled to identical dust caps.

Figure 12:
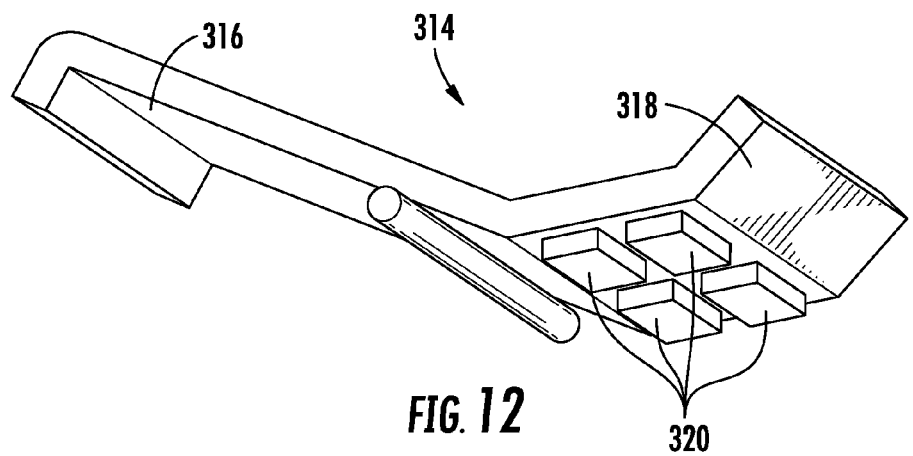

FIG. 12 is a perspective view of a mounting member of the dust cap of FIG. 9.

Figure 13:
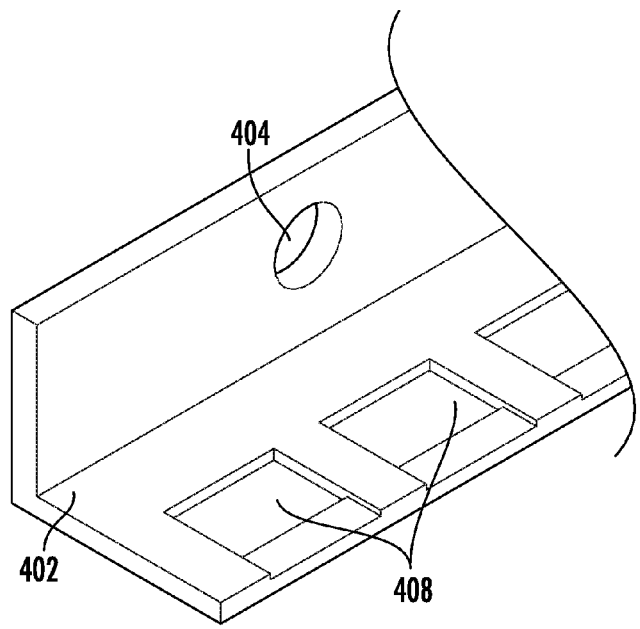

FIG. 13 is a partial perspective view of a dust cap holder.

Figure 14:
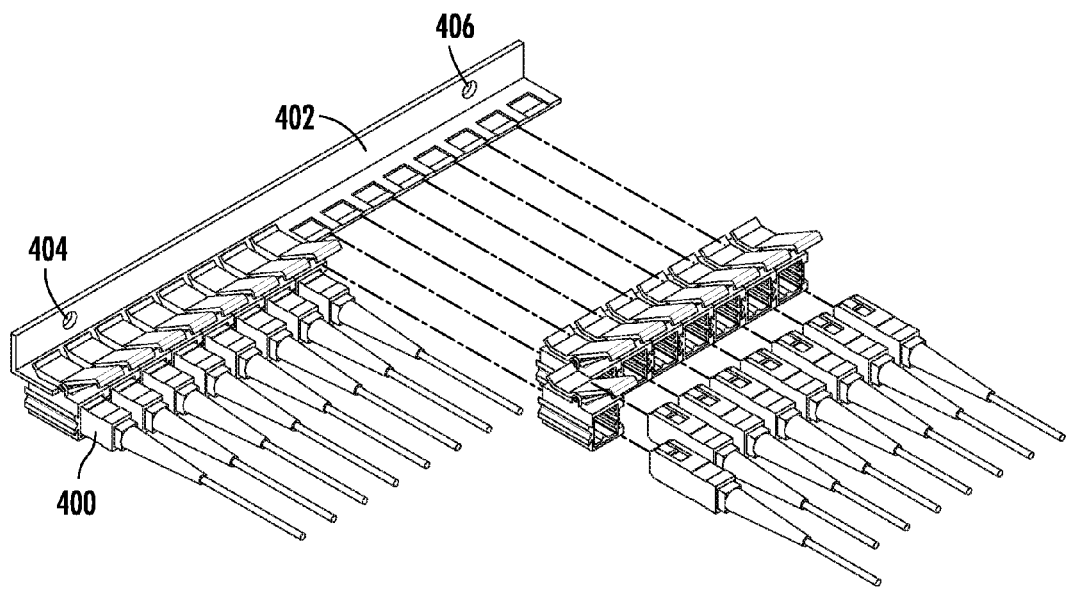

FIG. 14 is a partially exploded perspective view of multiple fiber optic assemblies of FIG. 10 as they are releasably coupled to the dust cap holder of FIG. 13.

Figure 15:
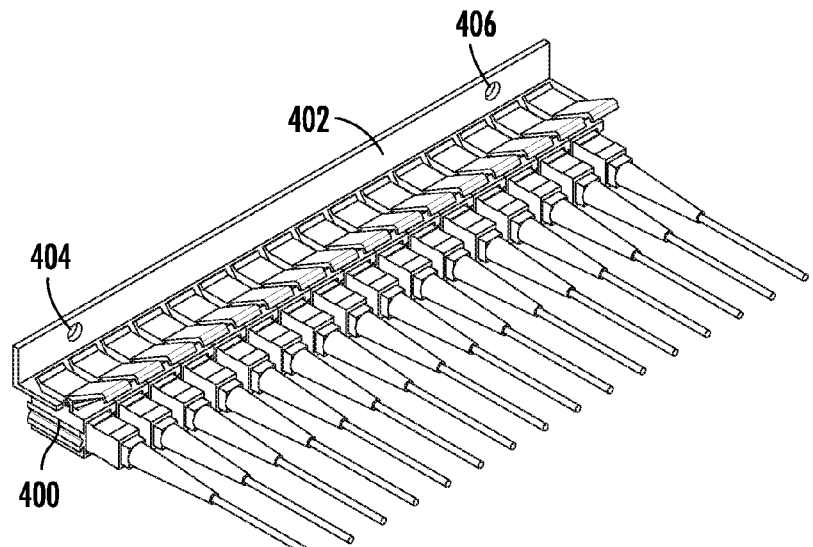

FIG. 15 is an assembled perspective view of the multiple fiber optic assemblies of FIG. 14 releasably coupled to the dust cap holder.

Figure 16:
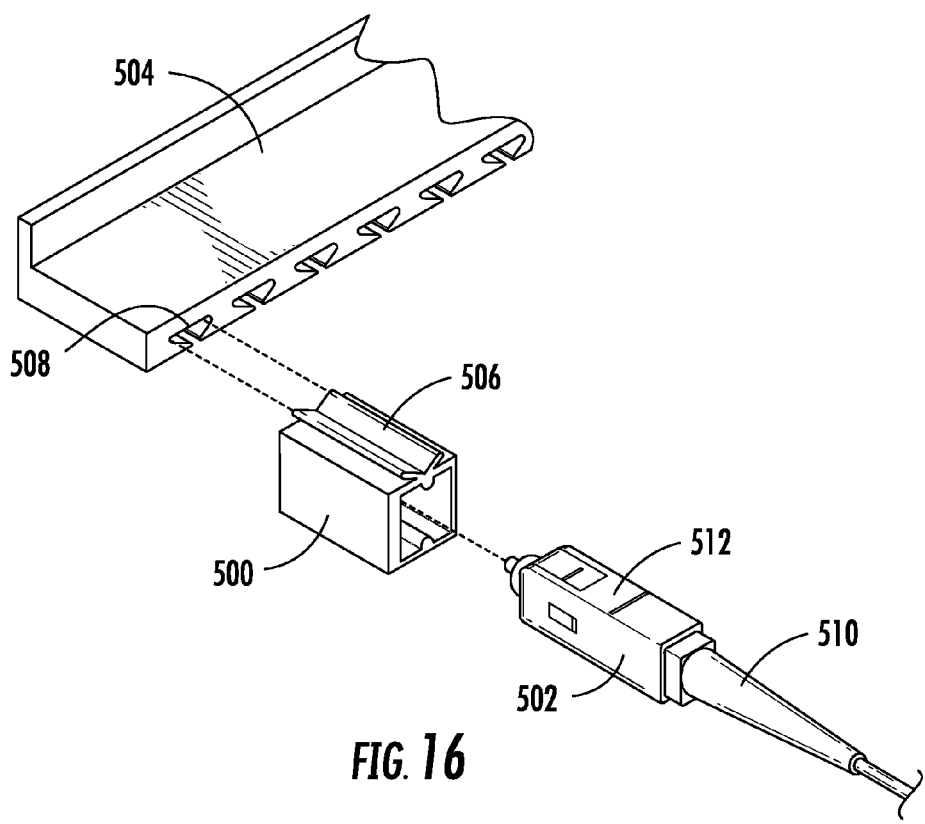

FIG. 16 is an exploded perspective view of a fiber optic assembly releasably coupled to a dust cap holder according to another example embodiment of the present disclosure.

Figure 17:
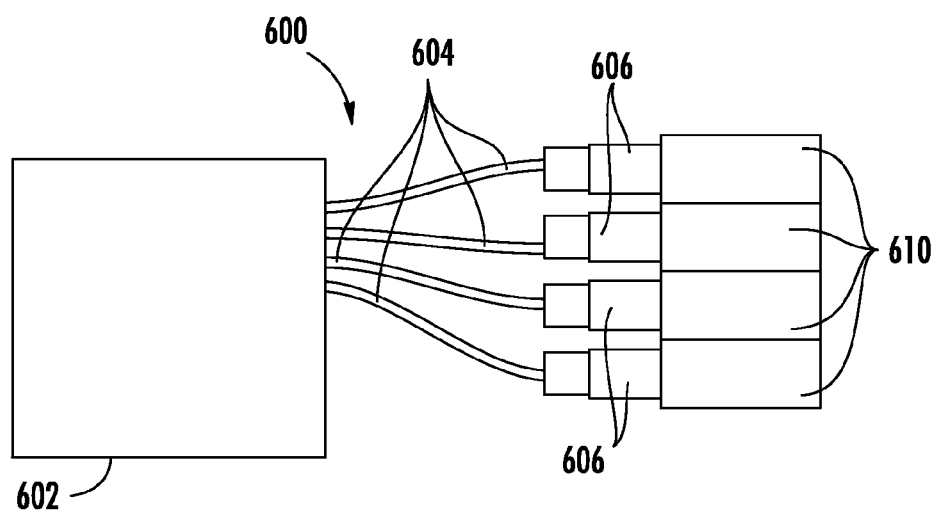

FIG. 17 is a side view of an optical module assembly according to another example embodiment of the present disclosure.

Figure 18:
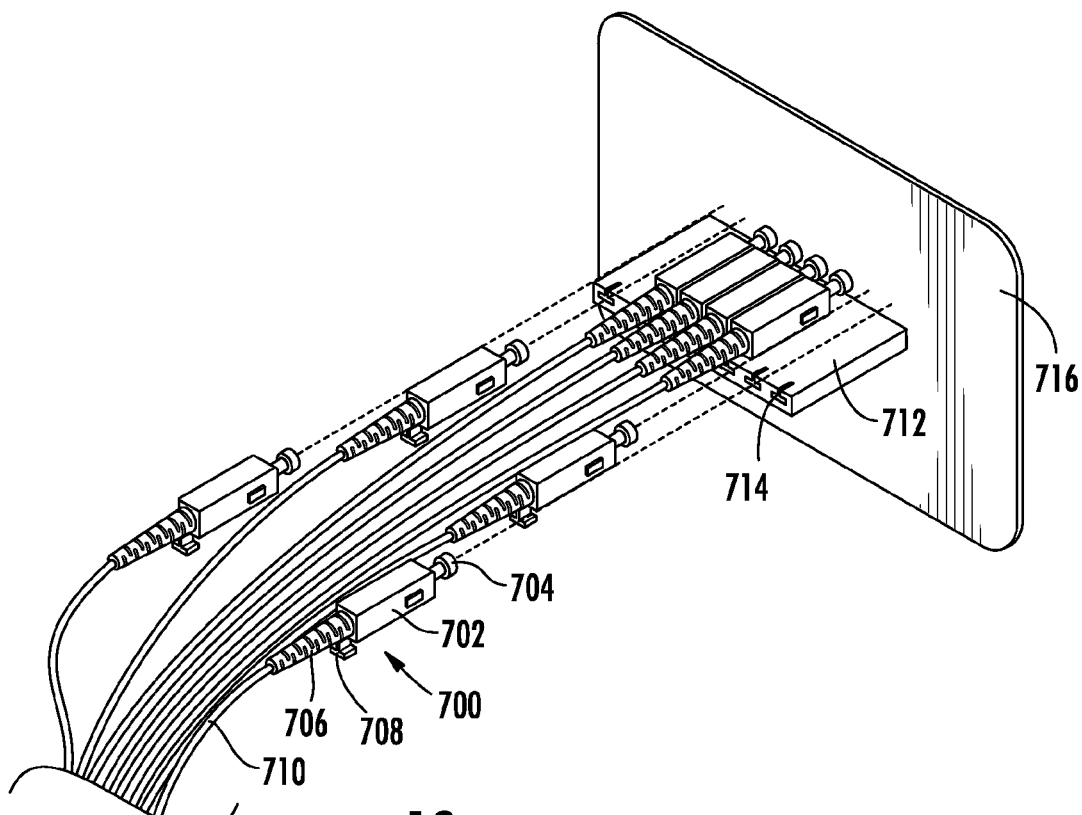

FIG. 18 is a partially exploded perspective view of multiple fiber optic assemblies according to yet another example embodiment of the present disclosure.

Figure 19:
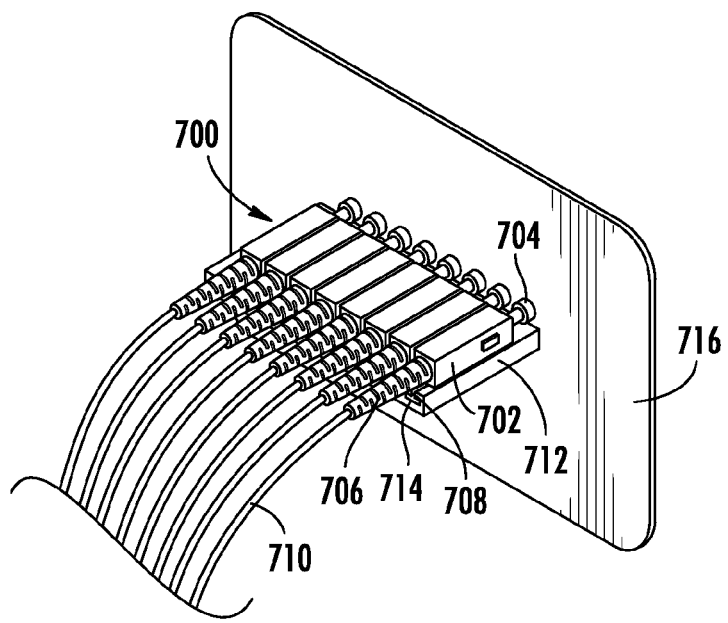

FIG. 19 is a perspective view of the multiple fiber optic assemblies of FIG. 18 releasably coupled to a holder.

Figure 20:
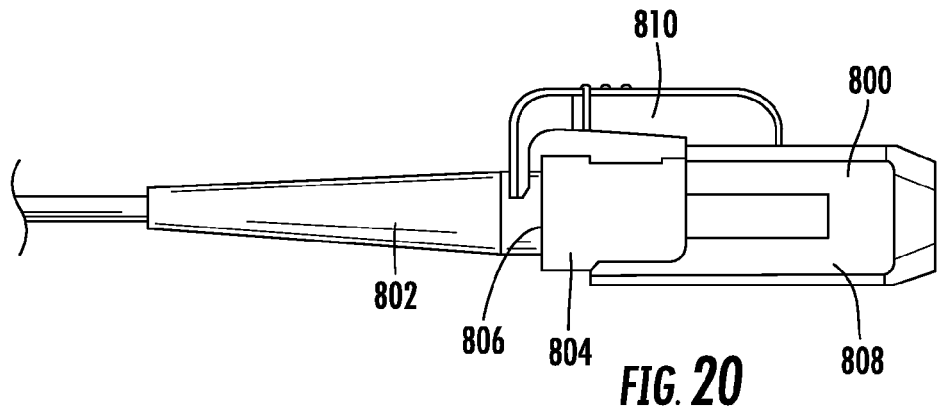

FIG. 20 is a side elevational view of a dust cap including a retaining member according to one example embodiment of the present disclosure.

Figure 21:
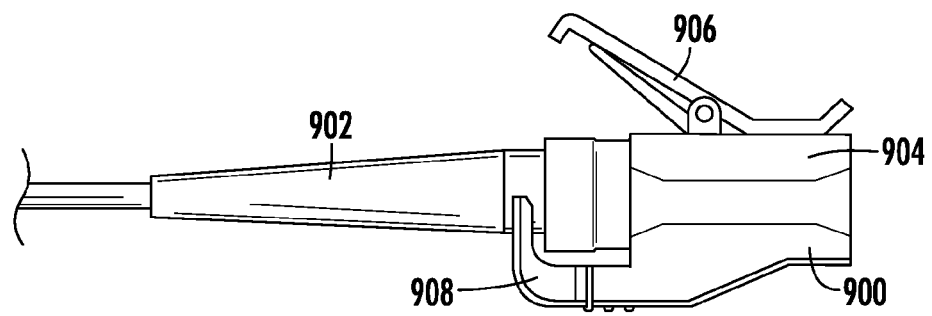

FIG. 21 is a side elevational view of a dust cap including a retaining member and a mounting member according to another example embodiment of the present disclosure.

Figure 22:
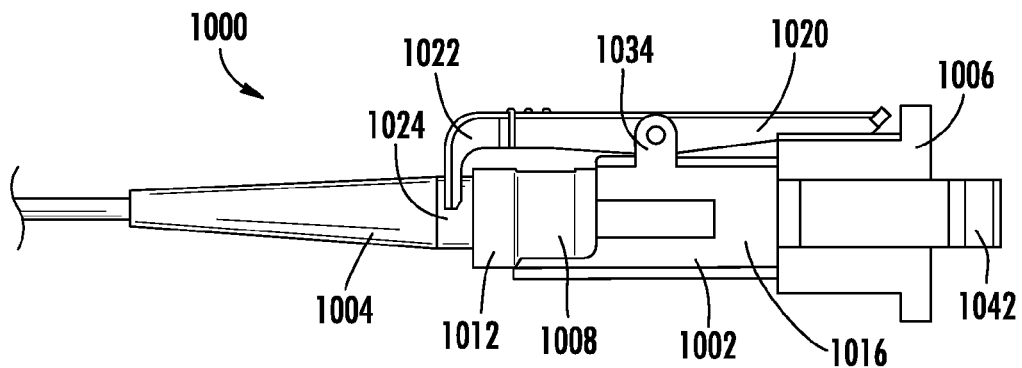

FIG. 22 is a side elevational view of a fiber optic assembly including a dust cap and a fiber optic connector according to yet another example embodiment of the present disclosure.

Figure 23:
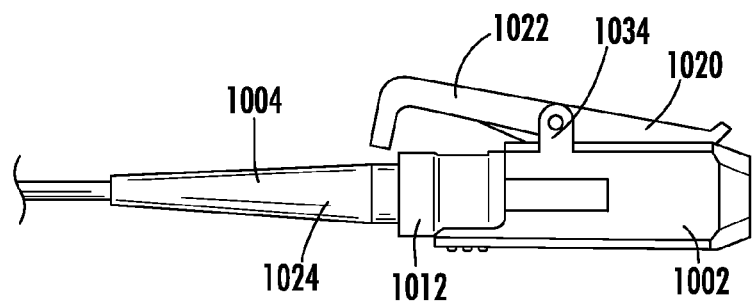

FIG. 23 is a side elevational view of the dust cap and the fiber optic connector of FIG. 22.

Figure 24:
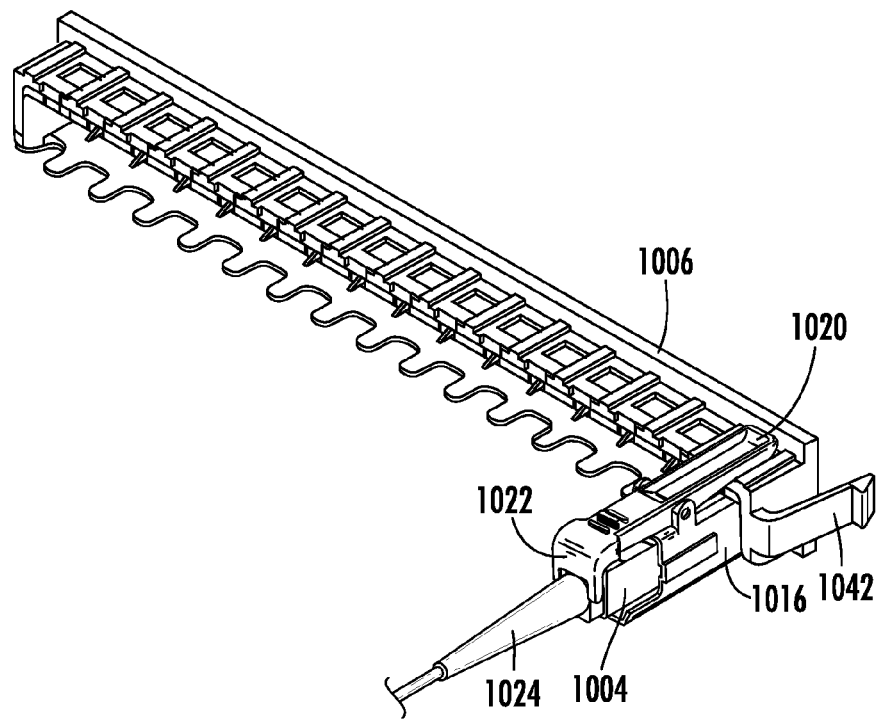

FIG. 24 is a perspective view of the fiber optic assembly of FIG. 22.

Figure 25:
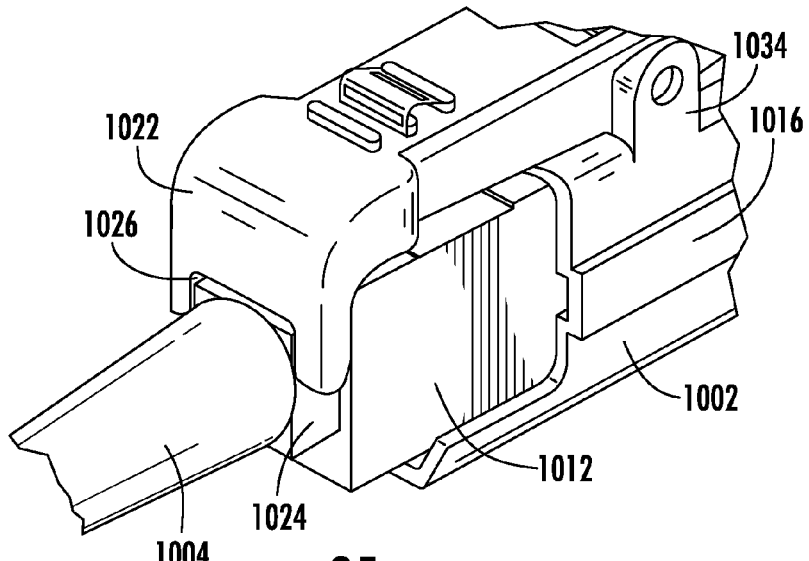

FIG. 25 is a partial perspective view of the fiber optic assembly of FIG. 22.

Figure 26:
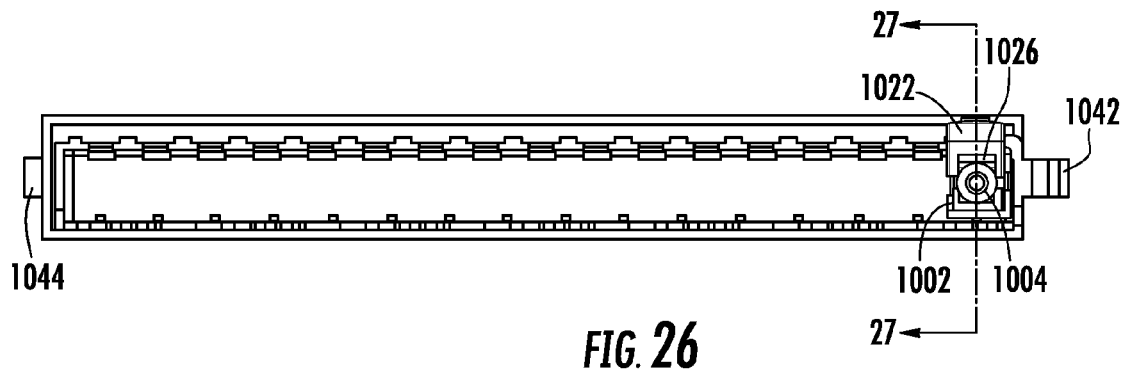

FIG. 26 is a front elevational view of the fiber optic assembly of FIG. 22.

Figure 27:
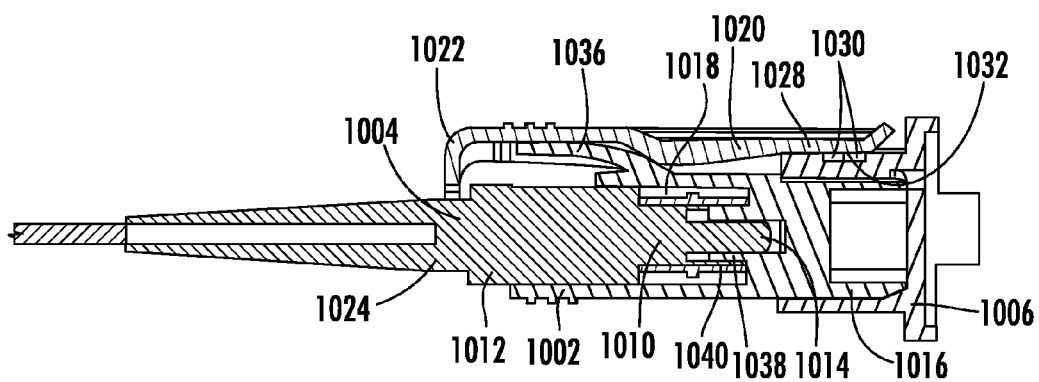

FIG. 27 is a cross-sectional view of the fiber optic assembly of FIG. 26, taken along line 27-27.

Figure 28:
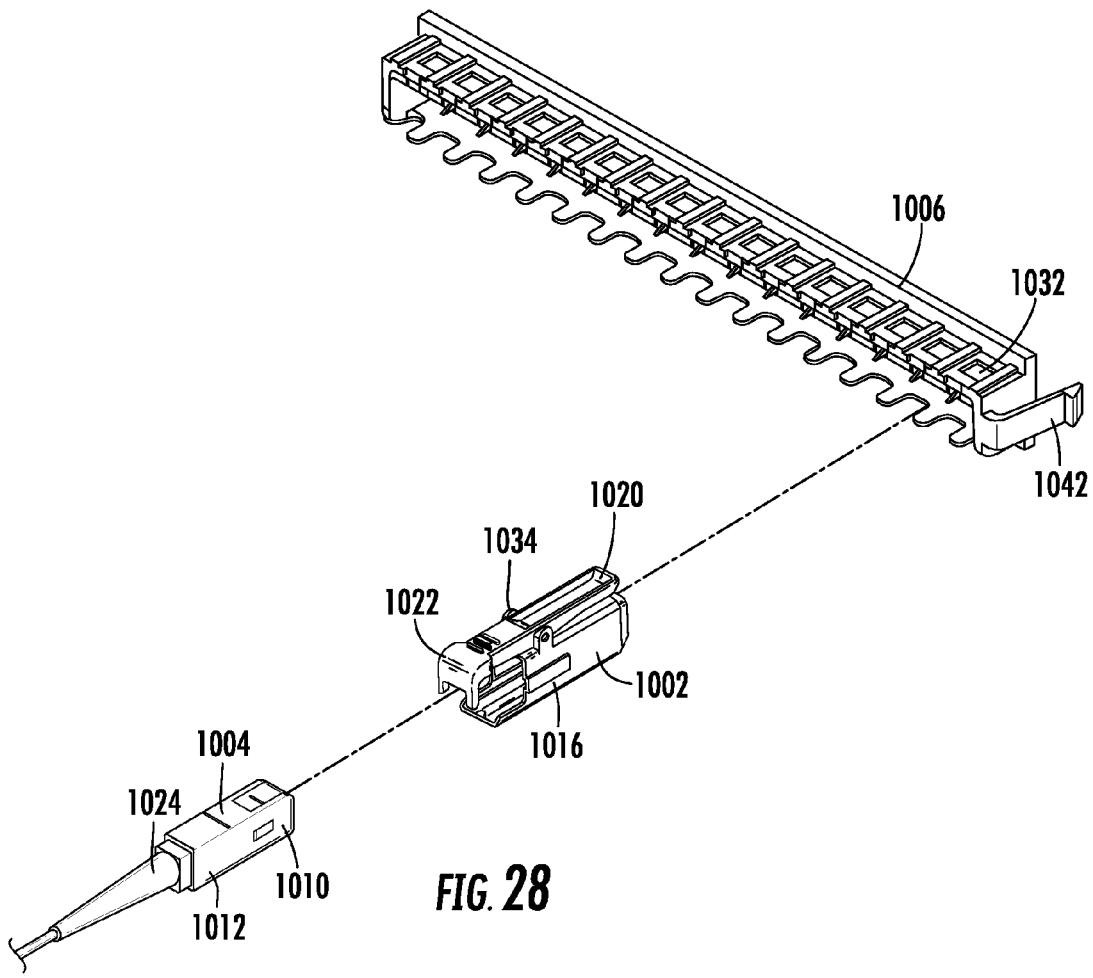

FIG. 28 is an exploded perspective view of the fiber optic assembly of FIG. 22.

Figure 29:
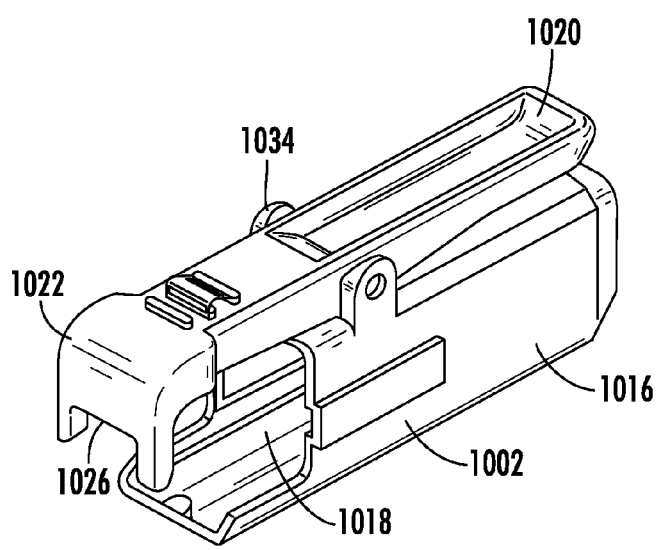

FIG. 29 is a perspective view of the dust cap of FIG. 22.

Figure 30:
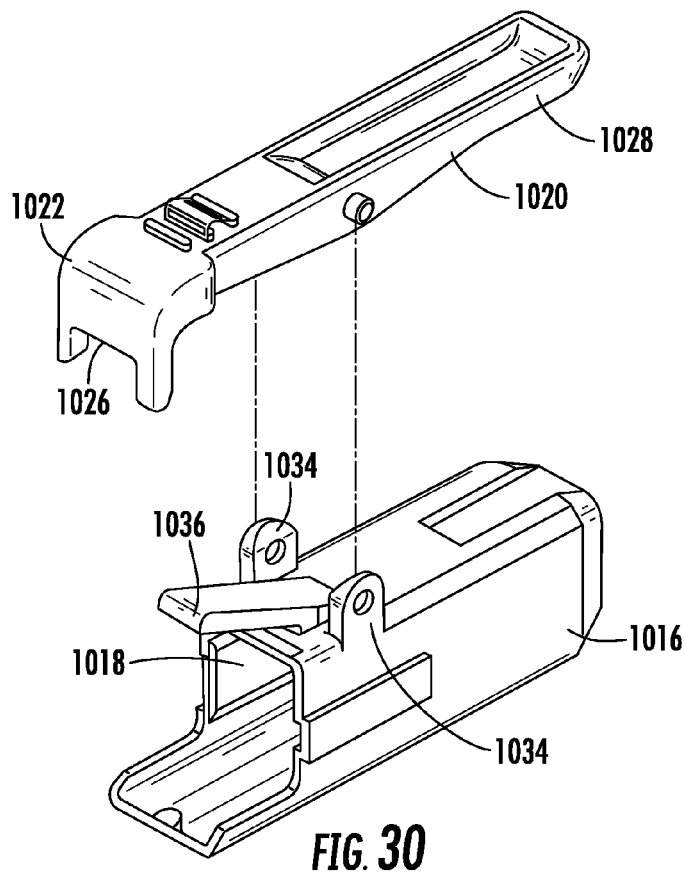
Figure 31A:
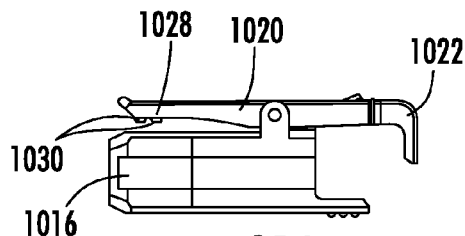
Figure 31B:
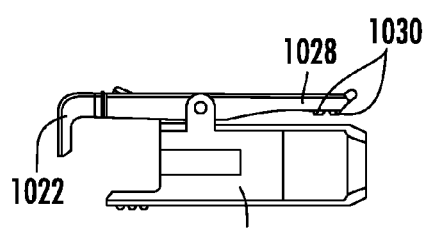
Figure 31C:
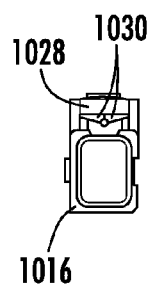
Figure 31D:
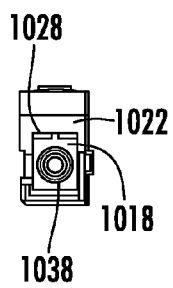
Figure 31E:
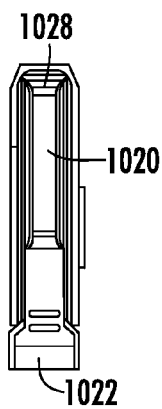
Figure 31F:

FIG. 30 is an exploded perspective view of the dust cap of FIG. 22.

FIGS. 31A-F are various views of the dust cap of FIG. 22.

Figure 32:
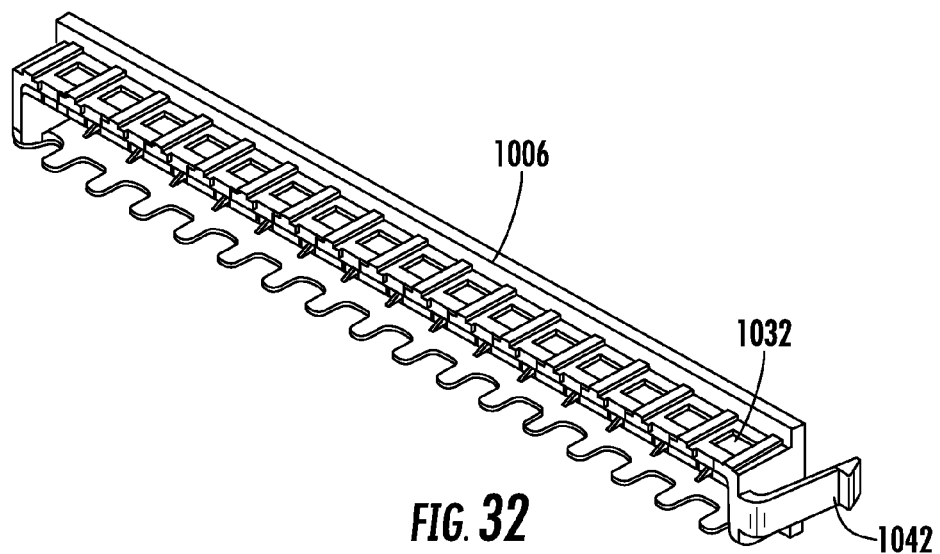

FIG. 32 is a front perspective view of the dust cap holder of FIG. 22.

Figure 33:
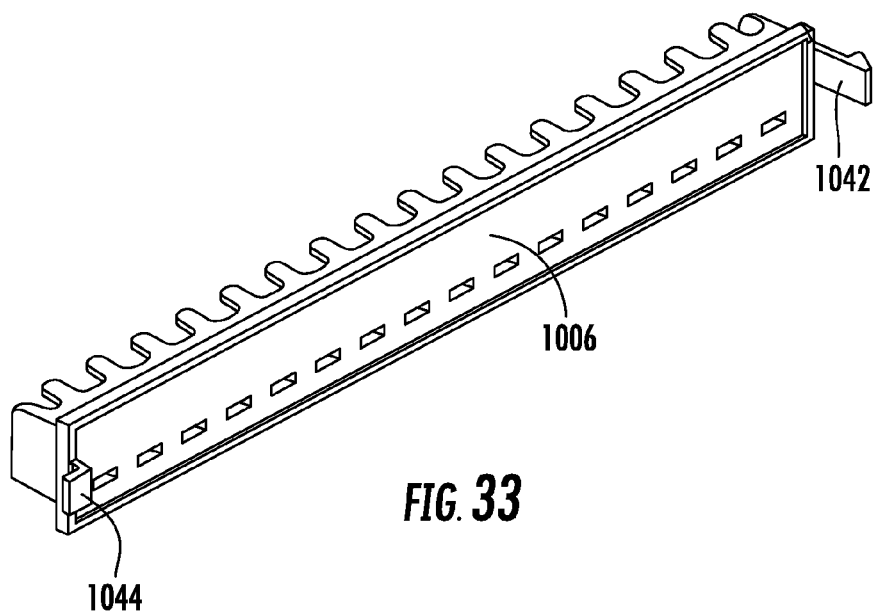

FIG. 33 is a rear perspective view of the dust cap holder of FIG. 22.

FIGS. 34A-F are various views of the dust cap holder of FIG. 22.

Figure 35:
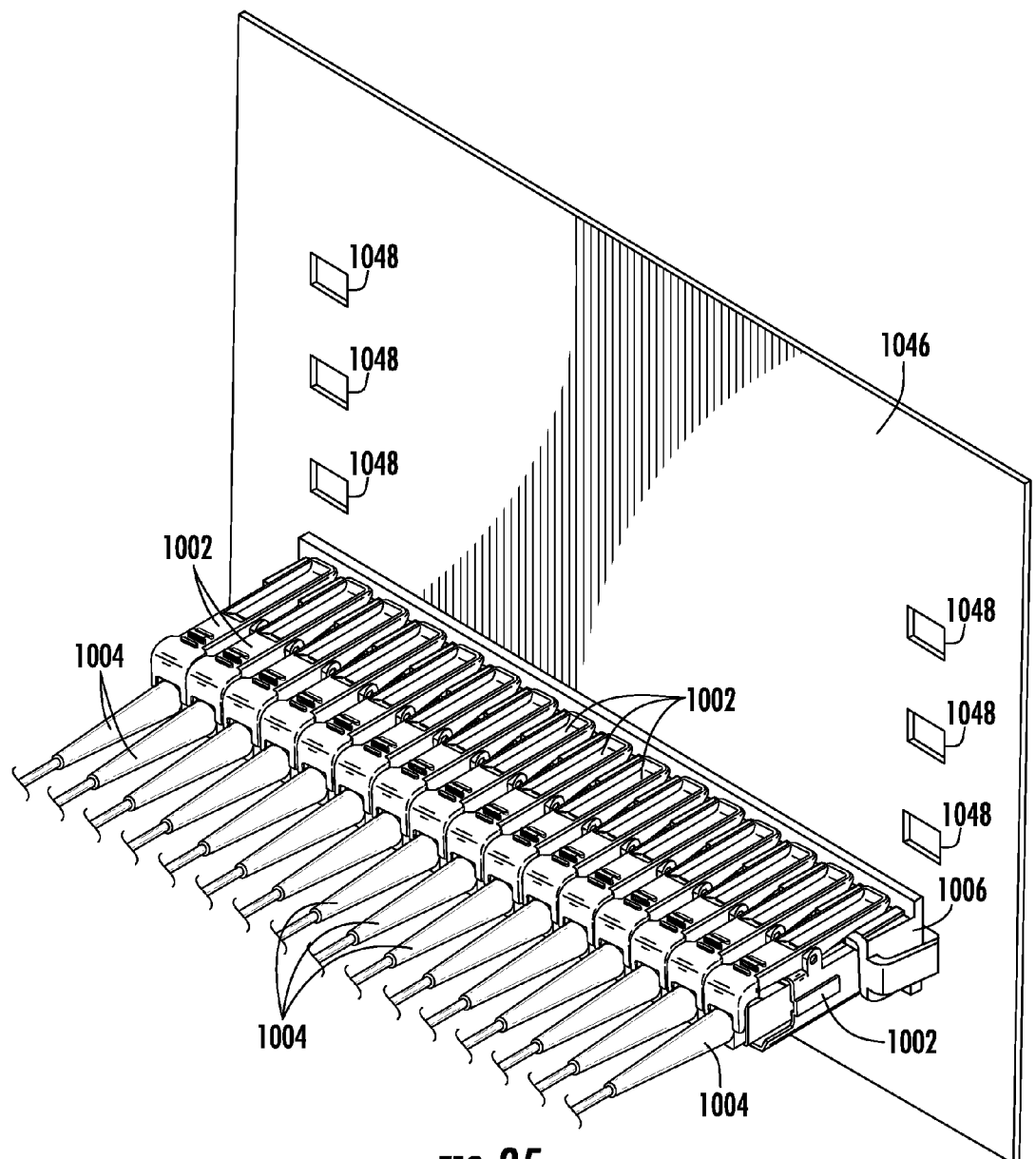

FIG. 35 is a perspective view of a fiber optic assembly including a dust cap holder and plurality of dust caps releasably engaged thereto.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "front", "rear", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A dust cap according to one example embodiment of the present disclosure is illustrated in FIGS. 1A-D (referred to collectively as "FIG. 1") and indicated generally by reference number 100. As shown in FIG. 1, the dust cap 100 includes a housing adapted to releasably engage one end of a fiber optic connector body to releasably couple the dust cap 100 to the fiber optic connector and protect the end face of an optical fiber in the fiber optic connector. Adapting the housing 102 to engage the connector body of the fiber optic connector reduces the likelihood of contact with the end face of the optical fiber, which could damage the end face or degrade its performance, when the dust cap is coupled to the fiber optic connector.

In the particular example shown in FIG. 1, the housing 102 is adapted to releasably engage an outer surface of one end of the fiber optic connector body without contacting the end face of the optical fiber or a ferrule holding the optical fiber. As shown in FIG. 1, the housing 102 defines a cavity 120 having an open end sized to receive the outer surface of one end of the fiber optic connector body. In other embodiments, the dust cap can be adapted to releasably engage an inner or other surface(s) of the fiber optic connector body either in addition to or instead of engaging the outer surface, and the open end of the cavity 120 may be sized to receive only the end face of the optical fiber and the ferrule holding the optical fiber. Further, the housing 102 or another portion of the dust cap 100 may be adapted to releasably engage the ferrule holding the optical fiber in addition to releasably engaging the fiber optic connector body.

The dust cap 100 shown in FIG. 1 also includes mounting members to releasably engage and couple the dust cap 100—and any fiber optic connector that is releasably coupled to the dust cap 100—to a support structure. The support structure will typically be part of a fiber optic apparatus for indoor or outdoor applications, such as a fiber optic enclosure (including fiber optic cabinets and pedestals), a fiber optic frame, etc. In the example shown in FIG. 1, the mounting members include a protuberance 126 and a biased clip 128, each of which is adapted for releasably engaging an aperture in the support structure as further explained below. Alternatively, other types of mounting members of various shapes and sizes can be employed to releasably couple the dust cap to a support structure. Although the dust cap 100 shown in FIG. 1 includes two mounting members 126, 128, more or less mounting members—or no mounting members—may be employed in other embodiments.

Additionally, the dust cap 100 shown in FIG. 1 is configured to releasably engage an adjacent dust cap to join at least two dust caps together. In particular, the housing 102 includes a tab 134 on one side and a slot 136 on an opposing side. The tab 134 is configured to releasably engage a slot in an adjacent dust cap, which may be similar or identical to dust cap 100. Likewise, the slot 136 is configured to releasably engage a tab on another adjacent dust cap, which may be similar or identical to dust cap 100. In the particular embodiment shown in FIG. 1, the tab 134 and the slot 136 have a complimentary dovetail configuration. It should be understood, however, that a variety of other structures (e.g., clips, clasps, fasteners, etc.) and techniques can be employed for releasably coupling two dust caps together without departing from the scope of this disclosure. Alternatively, a dust cap can be provided that is not configured to releasably engage an adjacent dust cap.

Further, in some embodiments of a dust cap having one or more mounting members for releasably coupling the dust cap to a support structure and/or a dust cap configured to releasably engage an adjacent dust cap, the dust cap housing may be configured not to engage the fiber optic connector body. For example, in such embodiments, the dust cap housing may engage a ferrule holding an optical fiber or otherwise cover the end face of the optical fiber without also engaging the connector body of the fiber optic connector.

The dust cap 100 shown in FIG. 1 has a monolithic construction (i.e., the dust cap 100 is cast or formed as a single part without joints). For example, the dust cap 100 shown in FIG. 1 may be formed as a single part from a thermoplastic material via injection molding. Alternatively, the dust cap 100 may be produced in two or more pieces that are subsequently combined into a single assembly.

Additionally, the dust cap 100 shown in FIG. 1 includes a key slot 148 to ensure the dust cap is coupled to the fiber optic connector in the correct orientation, as well as several ridges 150 extending into the cavity 120 for frictionally engaging complementary grooves (not shown) on the connector body of a fiber optic connector.

Figure 1A:
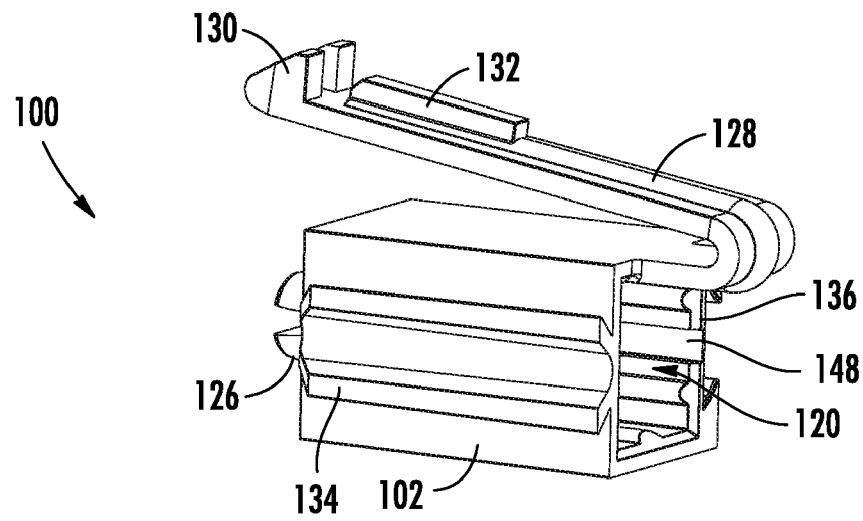
Figure 1B:
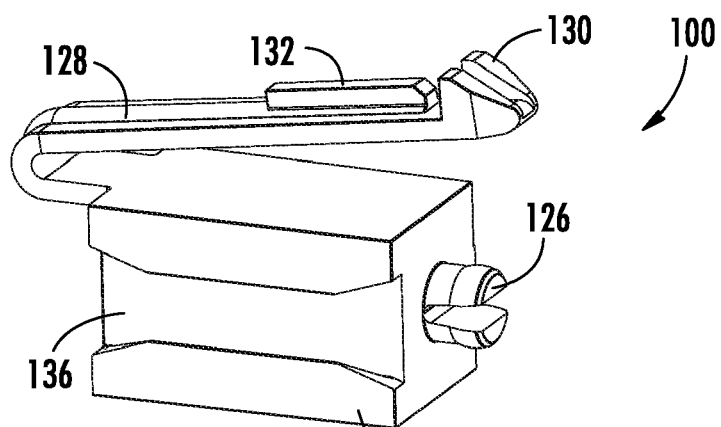
Figure 1C:
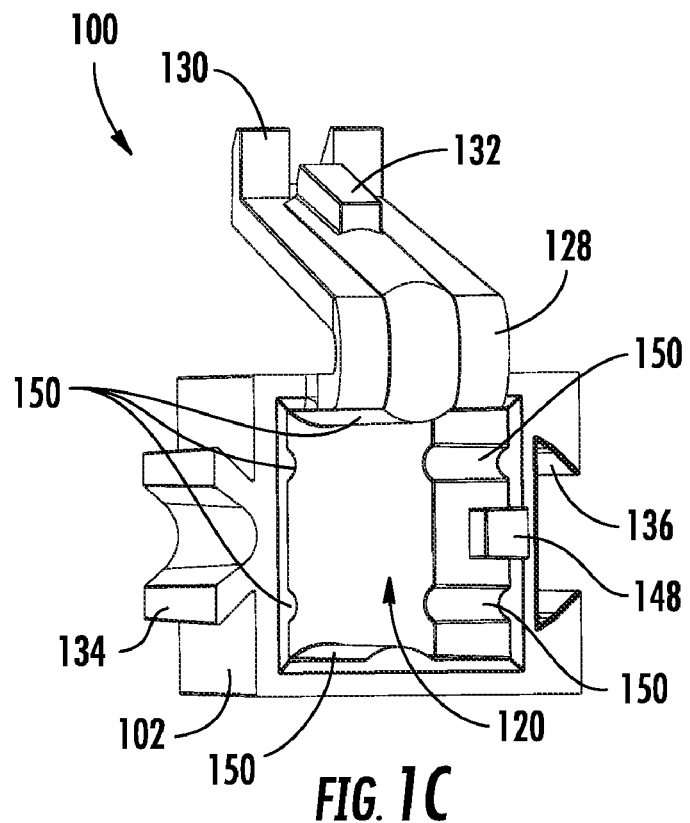
Figure 1D:
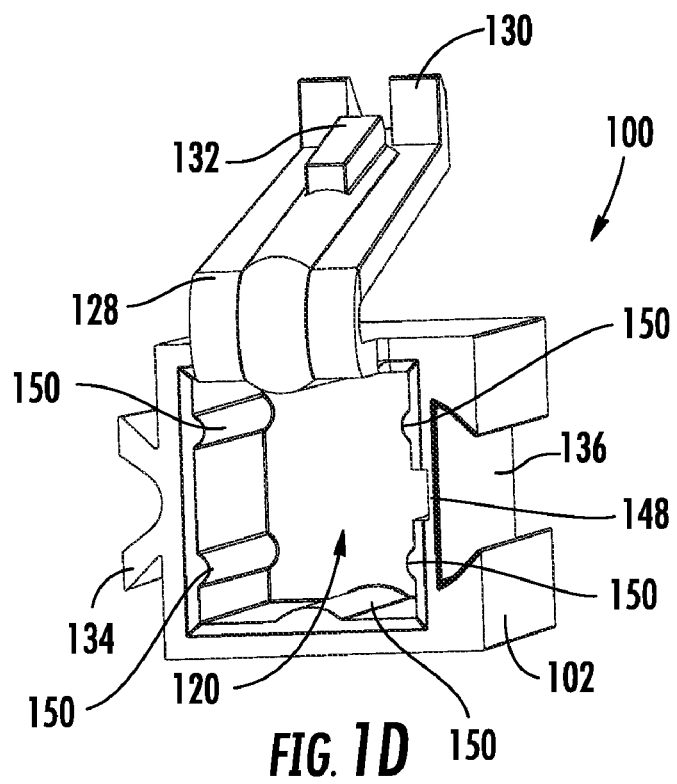
Figure 2:
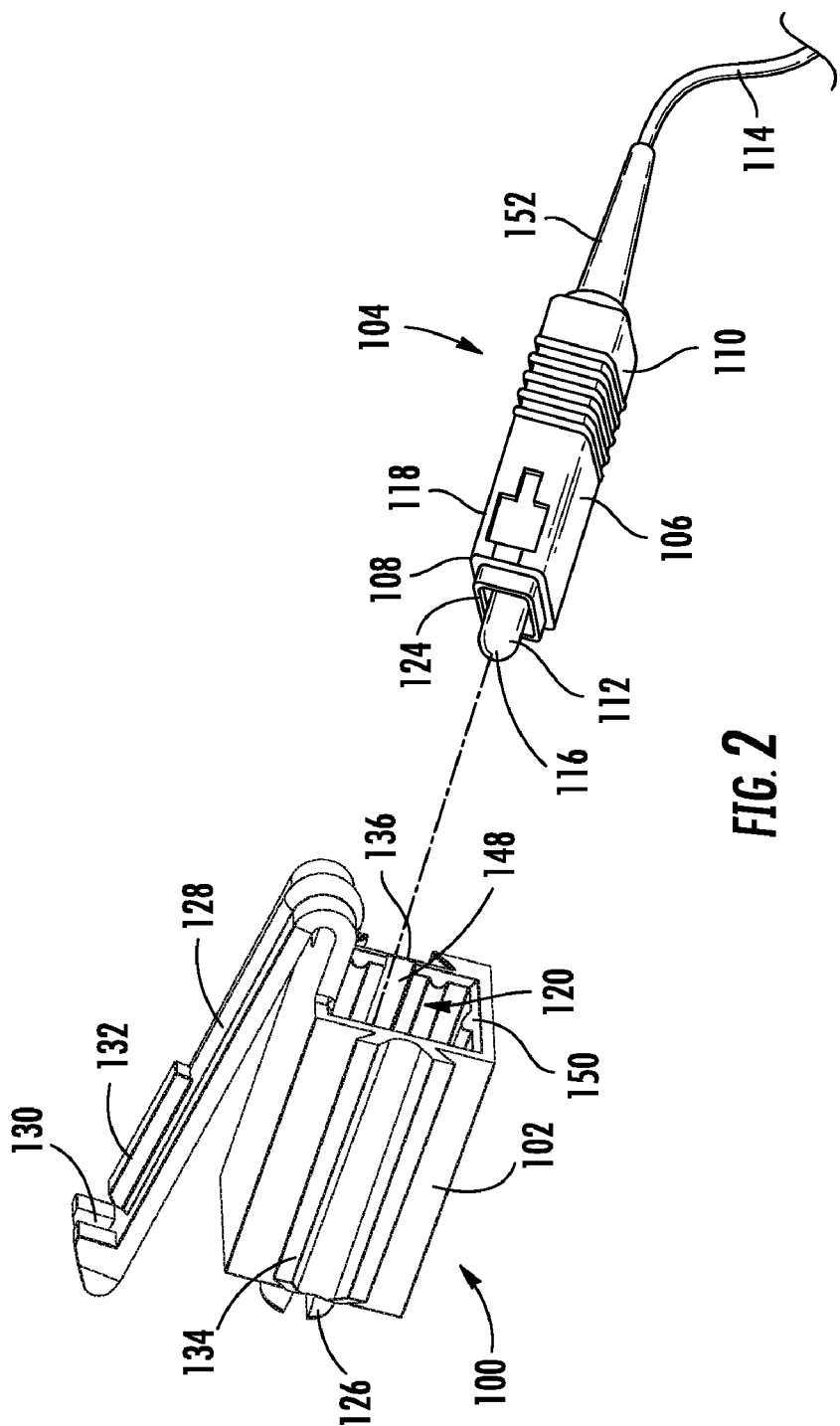
FIG. 2 is an exploded perspective view of a fiber optic assembly including the dust cap of FIG. 1.

FIG. 2 illustrates the dust cap 100 of FIG. 1 just before it is coupled to a fiber optic connector 104. As shown in FIG. 2, the fiber optic connector 104 includes a connector body 106 having a first end 108 and second end 110, and a ferrule 112 positioned at the first end 108 of the connector body 106. The ferrule 112 holds an optical fiber 114 having an end face 116. A boot 152 abuts the second end 110 of the connector body 106 and limits bending of the optical fiber 114. As noted above, the open end of the cavity 120 in the housing 102 is sized to receive and contact an outer surface 118 of the fiber optic connector body 106.

Figure 4:
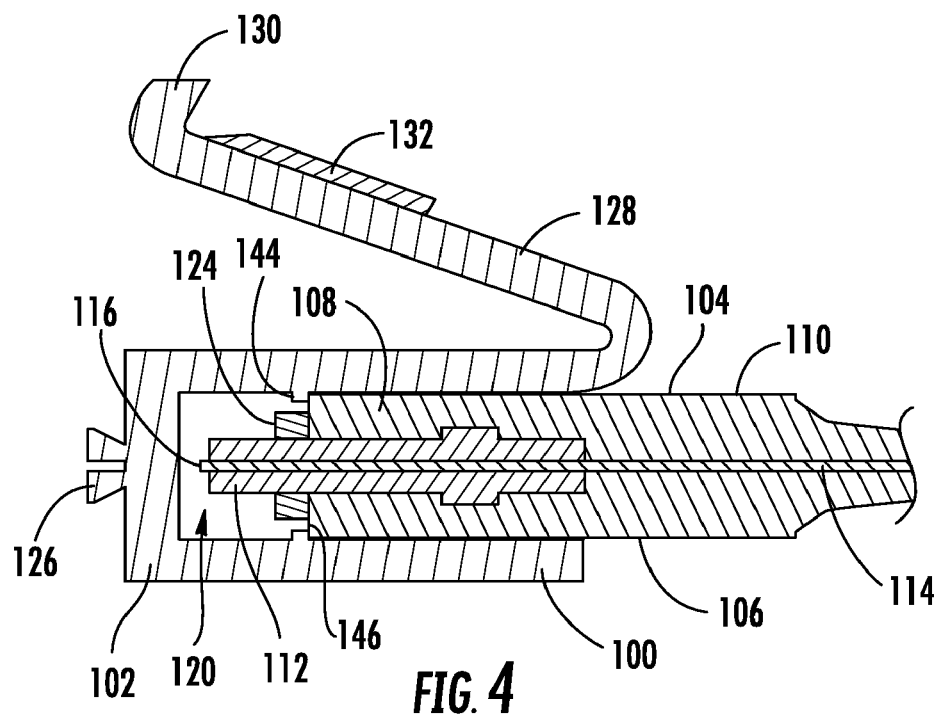
FIG. 4 is a cross-sectional view of the fiber optic assembly of FIG. 3, taken along line 4-4.

FIGS. 3 and 4 illustrate the dust cap 100 releasably coupled to the fiber optic connector 104. When so coupled, the housing 102 releasably engages the outer surface of the first end of the fiber optic connector body 106, encloses the end face 116 of the optical fiber 114, and protects the end face 116 of the optical fiber 114 (e.g., from contact by foreign objects, weather, etc). As best shown in FIG. 4, the housing 102 includes a shoulder 144 extending into the cavity 120. When the dust cap 100 is fully coupled to the fiber optic connector 104, the shoulder 144 engages an end face 146 of the connector body 106 and prevents the closed end of the cavity 120 from contacting the ferrule 112 or the end face 116 of the optical fiber 114. Still other embodiments of the dust cap may include a shoulder structured to releasably engage a connector hub 124 or one or more features of a different type of fiber optic connector.

FIGS. 5A and 5B illustrate the dust cap 100 releasably coupled to the fiber optic connector 104 and a support structure. More specifically, and as best shown in FIG. 5B, the dust cap's circular protuberance 126 is frictionally engaged with a generally circular aperture 140 in a panel 138. At the same time, a bias force is applied to the biased clip 128 to permit insertion of a catch 130 through a generally rectangular aperture 142 in the panel 138. The bias force is then removed from the biased clip 128, permitting the biased clip 128 to resiliently deflect back to its normal position with the panel 138 engaged between the catch 130 and a ridge 132 on the biased clip 128. Of course, the configuration of the support structure may be different in other embodiments, just as other types of mounting members may be employed on the dust cap 100. It should be clear from the above description that the dust cap 100 shown in FIG. 1 can be used not only to enclose and protect the end face of an optical fiber in a fiber optic connector, but also to support or "park" the protected fiber optic connector at the panel 138 (or another support structure such as a dust cap holder) until the fiber optic connector is placed into service. In the example shown in FIG. 5A, the panel 138 includes multiple circular apertures 140 and multiple rectangular apertures 142 for supporting or "parking" multiple dust caps 100 and fiber optic connectors 104 at the same time.

As shown in FIG. 6, the dust cap 100 can be decoupled from the panel 138 by pinching the biased clip 128 and the housing 102 together to deflect the biased clip 128 toward the housing 102 and disengage the catch 130 from the rectangular aperture 142. The dust cap 100 and the fiber optic connector 104 can then be separated from the panel 138 as an assembly, with the dust cap 100 still releasably coupled to the fiber optic connector 104. Following that, the dust cap 100 can be removed from the fiber optic connector 104 before (and preferably immediately prior to when) the fiber optic connector 104 is coupled to another fiber optic device, such as an optical adaptor for optically coupling a fiber optic connector to another fiber optic connector, a fiber optic splitter, etc. If desired, the dust cap 100 can then be re-parked in the panel 138, without the fiber optic connector 104, and possibly reused with another (or the same) fiber optic connector in the future. Alternatively, the fiber optic connector 104 can be decoupled from the dust cap 100 while the dust cap 100 is still coupled to the panel 138. As should be apparent, the method of unparking a fiber optic connector described above can be employed in a wide variety of fiber optic apparatuses for indoor or outdoor applications.

FIG. 7A illustrates the dust cap 100 of FIG. 1 releasably engaged with an identical dust cap 100 via the tabs 134 and slots 136. In this manner, two or more dust caps 100 can be joined together before the dust caps 100 are coupled to fiber optic connectors (as shown in FIG. 7A) or after the dust caps 100 are coupled to fiber optic connectors. FIG. 7B illustrates the two dust caps 100 releasably coupled to fiber optic connectors 104 and to the panel 138 for parking the fiber optic connectors 104 until they are placed into service. As should be apparent, the dust caps 100 and the fiber optic connectors 104 may be coupled to and/or decoupled from the panel 138 as a group or individually, as desired.

FIG. 8 illustrates a dust cap 200 according to another example embodiment. The dust cap 200 shown in FIG. 8 is similar to the dust cap 100 shown in FIG. 1, and includes a housing 202 defining a cavity 204. In addition, and unlike the dust cap 100 of FIG. 1, the dust cap 200 of FIG. 8 includes a generally circular collar 206 protruding from the closed end 208 and toward the open end of the cavity 204. The collar 206 abuts the end face of a connector hub of a fiber optic connector (e.g., the connector hub 124 of fiber optic connector 104 shown in FIG. 4) to form a seal therebetween for preventing dust contamination or damage to the end face of an optical fiber. A different embodiment of a connector collar may be structured to engage an inner portion, an outer portion, an inner housing and/or an end face of a connector hub, possibly depending on the type of fiber optic connector employed. Further, different shapes and sizes of collars and connector hubs, complimentary and non-complimentary, may be included in other dust cap embodiments.

FIGS. 9A-C illustrate a dust cap 300 according to yet another example embodiment of this disclosure. As shown therein, the dust cap 300 includes a housing 302. The housing 302 is adapted to engage a first end 304 of the outer surface of a connector body 306 of a fiber optic connector 308 to protect an exposed end face of the optical fiber 309, as shown in FIG. 10. A second end of the connector body 306 abuts or couples to a boot 328 disposed about the optical fiber 309. The housing 302 also defines a tab 310 and a slot 312 for releasably engaging adjacent dust caps 300, as shown in FIG. 11. The dust cap 300 further includes a generally rectangular collar 322 and a closed end 324. The collar 322 is structured to contact an outer portion of a generally rectangular connector hub (not shown) of the fiber optic connector 308 and abut an end face of the fiber optic connector 308, to form a seal therebetween for protecting the end face of the optical fiber 309.

The dust cap 300 includes a mounting member 314 pivotally coupled to a top surface of the dust cap 300. The mounting member 314 includes a thumb portion 316 and an engagement portion 318. Applying a downward force on the thumb portion 316 causes the engagement portion 318 to pivot upwardly so it can engage a complementary support structure. A biasing member 326 is positioned below the thumb portion 316 and biases the mounting member 314 to its normal position, shown in FIG. 9, when no downward force is applied to the thumb portion 316.

FIG. 12 illustrates a bottom side of the engagement portion 318, which includes several generally rectangular projections 320 for engaging a complementary support structure. More specifically, the engagement portion 318 and its projections 320 are adapted to engage a depression 408 in a dust cap holder 402 as shown in FIG. 13. The dust cap holder 402 includes multiple depressions 408 for supporting multiple dust caps 400, as shown in FIGS. 14 and 15. The dust cap holder 402 further includes one or more apertures 404, 406 for attaching the dust cap holder 402 to another support structure. Of course, a variety of other dust cap holder configurations can be employed, if desired, without departing from the scope of this disclosure.

FIG. 16 illustrates a fiber optic assembly including a dust cap 500, a fiber optic connector 502, and a boot 510 abutting an end of the connector body 512 of the fiber optic connector 502 according to another example embodiment. The dust cap 500 is adapted to releasably engage an end of the connector body 512 of the fiber optic connector 502 to releasably couple the dust cap 500 to the fiber optic connector 502 and protect an end face of the optical fiber. In this embodiment, the dust cap 500 is not configured to engage an adjacent dust cap. The dust cap 500 includes a mounting member 506 for releasably engaging a slot 508 in a dust cap holder 504 to couple the dust cap 500 to the dust cap holder 504 and supporting the dust cap 500 and the fiber optic connector 502 from the dust cap holder 504. As shown in FIG. 16, the mounting member 506 and the slot 508 have a complimentary dovetail configuration.

As should be apparent, the teachings of the present disclosure can be applied to a variety of optical module assemblies to facilitate installation or connection of the optical module assemblies in fiber optic apparatuses.

FIG. 17 illustrates an optical module assembly 600 according to another example embodiment. As shown in FIG. 17, the optical module assembly 600 includes a housing 602 and several pigtails 604 extending from the housing 602 and terminated by fiber optic connectors 606. The housing 602 may enclose, for example, a fiber optic splitter and/or other optical components, etc. Each fiber optic connector 606 is releasably coupled to a dust cap 610, and each dust cap 610 may be releasably coupled to one or more other dust caps 610. Additionally, each dust cap 610 includes at least one mounting member for releasably engaging a support structure (such as a panel, a dust cap holder, etc). Although not shown in FIG. 17, the optical module assembly 600 may further include a dust cap holder, with each dust cap 610 releasably coupled to the dust cap holder.

When the assembly 600 of FIG. 17 is installed in a fiber optic enclosure, the dust caps (or the dust cap holder, if applicable) can be readily coupled to a support structure to thereby park the multiple protected fiber optic connectors 606 at the same time. Alternatively, the dust caps 610 may not be coupled to one another so that, for example, each fiber optic connector 606 can be individually parked or coupled to another fiber optic device as desired.

An optical module assembly may also or alternatively include one or more dust caps each configured to releasably engage a connector body of a fiber optic connector and/or an adjacent dust cap according to the teachings provided herein.

FIGS. 18 and 19 illustrate fiber optic connector assemblies 700 according to yet another embodiment of the present disclosure. Each fiber optic assembly 700 includes a fiber optic connector 702 having two ends and a boot 706 abutting one end, and an optical fiber 710. A ferrule (not shown) of the fiber optic connector 702 holds the optical fiber 710, and a dust cap 704 is mounted on the ferrule. The boot 706 includes a mounting member 708 for releasably coupling the boot 706—and the fiber optic connector 702—to a boot holder 712. In the embodiment of FIGS. 18 and 19, the mounting member includes a generally T-shaped tab 708 structured to releasably engage a slot 714 of the boot holder 712. When so engaged, the boot 706 and the boot holder 712 support the fiber optic connector 702, the dust cap 704, and the optical fiber 710 from a support structure 716.

Another aspect of the present disclosure includes a method of managing a fiber optic connector and a dust cap. The fiber optic connector includes a connector body having first and second ends and a ferrule positioned at the first end of the connector body. The dust cap includes a housing defining a cavity and a retaining member coupled to the housing. The method includes deflecting the retaining member of the dust cap away from the second end of the connector body of the fiber optic connector and removing the ferrule of the fiber optic connector from the cavity of the dust cap. In this manner, the retaining member generally inhibits unintentional, unnecessary and/or untimely removal of the fiber optic connector from the dust cap, which may expose an optic fiber held by the ferrule of the fiber optic connector to dust, debris, damage, etc.

In various embodiments, the retaining member may be deflected by disengaging the dust cap from a support structure, such as a dust cap holder or panel. Additionally, or alternatively, the method may include releasably coupling a dust cap holder to a support structure.

Example embodiments of dust caps and assemblies suitable for use in the method described above are described herein. It should be understood, however, that the example embodiments are provided for illustrative purpose only, and the methods described herein may be practiced with a variety of different dust caps and/or assemblies.

FIG. 20 illustrates a dust cap 800 for a fiber optic connector 802 according to one example embodiment. The fiber optic connector 802 includes a connector body 804 having a first end (not visible) and a second end 806 opposite the first end. The fiber optic connector also includes a ferrule positioned at the first end of the connector body 804. The dust cap 800 includes a housing 808 defining a cavity for receiving the ferrule of the fiber optic connector 802 and a retaining member 810 coupled to the housing 808. The retaining member 810 is structured to be disposed adjacent to the second end 806 of the connector body 804 when the ferrule is disposed in the cavity to inhibit removal of the fiber optic connector 802 from the dust cap 800.

In this example embodiment, upon attempted removal of the fiber optic connector 802 (without deflecting the retaining member 810), the retaining member 810 contacts the second end 806 of the connector body 804, thereby inhibiting removal of the fiber optic connector 802. Contact between the retaining member 810 and the fiber optic connector 802 may be limited to the second end 806 of the connector body 804, or may include contact with an additional or different part of the connector body 804 and/or the fiber optic connector 802, such as the boot. A retaining member may also include a variety of configurations (shapes, sizes, types, numbers, orientations, etc.) to contact the fiber optic connector and inhibit removal of a fiber optic connector from a dust cap.

FIG. 21 illustrates a dust cap 900 for a fiber optic connector 902 according to another example embodiment. The dust cap 900 includes a housing 904 defining a cavity for receiving a ferrule of the fiber optic connector 902, a mounting member 906 for releasably engaging a support structure, and a retaining member 908. The retaining member 908 is structured to be disposed adjacent to the second end (opposite the ferrule) of the connector body of the connector 902 to inhibit removal of the fiber optic connector 902 from the dust cap 900 when the ferrule is disposed within the cavity.

The mounting member 906 and the retaining member 908 are separate in the example shown in FIG. 21. Accordingly, each may operate independent of the other. The mounting member 906 is constructed separately from the retaining member 908 and housing 904 (similar to the mounting member 314 of dust cap 300). In this example, the retaining member 908 is constructed of a material sufficiently resilient to allow deflection of the retaining member 908 to permit removal of the fiber optic connector 902. Further, the retaining member 908 and the housing 904 have a monolithic construction in this example embodiment. As should be apparent, the retaining member and housing may be separately formed and assembled in other embodiments.

FIGS. 22-28 illustrate a fiber optic assembly 1000 according to another example embodiment. The fiber optic assembly 1000 includes a dust cap 1002, a fiber optic connector 1004, and a dust cap holder 1006. The fiber optic connector 1004 includes a connector body 1008 having a first end 1010 and a second end 1012 opposite the first end 1010 and a ferrule 1014 positioned at the first end 1010. The dust cap 1002 includes a housing 1016 defining a cavity 1018 and a mounting member 1020 releasably engaging the dust cap 1002 to the dust cap holder 1006. The dust cap 1002 also includes a retaining member 1022 structured to be disposed adjacent to the second end 1012 of the connector body 1008 to inhibit removal of the fiber optic connector 1004 from the dust cap 1002.

The retaining member 1022 is operably coupled to the mounting member 1020 to inhibit removal of the fiber optic connector 1004 from the dust cap 1002 when the dust cap 1002 is releasably engaged to the dust cap holder 1006. Conversely, as shown in FIG. 23, the retaining member 1022 is operably coupled to the mounting member 1020 to permit removal of the fiber optic connector 1004 from the dust cap 1002 when the dust cap 1002 is disengaged from the dust cap holder 1006. Accordingly, the dust cap 1002 and fiber optic connector 1004 can be disengaged from the dust cap holder 1006 by deflecting the mounting member 1020 upwardly (in FIG. 22) before withdrawing the dust cap 1002 and fiber optic connector 1004 from the dust cap holder 1006. Preferably, the fiber optic connector 1004 cannot be removed from the dust cap 1002 while the dust cap 1002 is engaged to the dust cap holder 1006. In this manner, the dust cap 1002 is retained on the fiber optic connector 1004 until the fiber optic connector 1004 is unparked and routed for service, thereby limiting exposure of the optic fiber within the fiber optic connector 1004 to dust, debris, damage, etc.

As shown in FIG. 25, the retaining member 1022 defines a notch 1026 disposed adjacent to the second end 1012 of the connector body 1008 and straddling the boot 1024 of the fiber optic connector 1004. The notch 1026 has a generally rectangular shape that is complimentary to the rectangular shape of a portion of the boot 1024 abutting the second end 1012 of the connector body 1008. The notch may take other shapes in other embodiments, and may straddle different or additional portions of the fiber optic connector.

In the illustrated embodiment, the retaining member 1022 comprises a substantially rigid material that permits the retaining member 1022 and mounting member 1020 to pivot relative to the housing 1016. The mounting member 1020 and retaining member 1022 have a monolithic construction in this example dust cap. Alternately, the mounting member and the retaining member may be formed separately (of the same or different materials) and assembled together.

As shown in FIGS. 31A-F, the mounting member 1020 includes an engagement portion 1028, having a plurality of projections 1030. FIG. 27 illustrates the plurality of projections 1030 disposed in a depression 1032 of the dust cap holder 1006. The projections 1030 and the depression 1032 interact to resist lateral movement of the dust cap 1002 relative to the dust cap holder 1006. As should be apparent, the dust cap holder may be configured differently (e.g., with holes, etc.) to cooperate with the engagement portion and/or another portion of the dust cap, with or without using projections, to resist lateral movement of the dust cap relative to the dust cap holder.

Further, as shown in FIGS. 22-23, the retaining member 1022 and mounting member 1020 are pivotally coupled to the housing, via flanges 1034. Similar to the dust cap 300, the dust cap 1002 includes a biasing member 1036 formed with and extending from the housing 1016 to make contact with and bias the mounting member 1020 toward the housing 1016. FIG. 27 illustrates the biasing member 1036 in a downwardly deflected position. Accordingly, the biasing member 1036 biases the engagement portion 1028 downwardly (in FIG. 27), to releasably engage the dust cap holder 1006 between the engagement portion and the housing 1016. As should be apparent, the biasing member and dust cap may be configured differently and/or formed separately in other dust cap embodiments.

The fiber optic connector 1004 includes an inner housing 1040 and the dust cap 1002 includes a collar 1038. The inner housing 1040 is disposed about the ferrule 1014. The collar 1038 is disposed between the ferrule 1014 and the inner housing 1040. The collar 1038 contacts the inner housing 1040, to form a seal therebetween for protecting the end face of the optical fiber held by the ferrule 1014, while maintaining a gap between the collar 1038 and the ferrule 1014. Alternatively, the collar may contact only the ferrule, or may contact both the ferrule and the inner housing. The collar 1038 is monolithically formed with the housing 1016, but may be formed separately from the housing. The collar may be configured differently in other embodiments, possibly depending on the type and shape of the fiber optic connector.

As shown in FIGS. 32-34, the dust cap holder 1006 includes sixteen (16) mounting positions for dust caps. Each of the mounting positions is keyed to accept the dust caps in only one orientation, to ensure engagement between the projections 1030 of the mounting member 1020 and the depressions 1032 of the dust cap holder 1006. Other dust cap holder embodiments may include different configurations (e.g., capacities, orientations, shapes, sizes, etc.).

FIG. 33 illustrates a plurality of tabs 1042, 1044 to releasably engage the dust cap holder 1006 to a support structure. One of the tabs 1044 is fixed, and the other tab 1042 is resilient. As should be apparent, a variety of other structures (e.g., clips, clasps, fasteners, etc.) and techniques can be employed to engage the dust cap holder to a support structure—releasably or fixedly.

FIG. 35 illustrates the fiber optic assembly of FIG. 24 with multiple dust caps 1002 and fiber optic connectors 1004. The fiber optic assembly is releasably engaged to apertures defined in a panel 1046 to support or "park" the multiple protected fiber optic connectors 1004 at the same time, until one or more of the fiber optic connectors 1004 is placed into service. In the example shown in FIG. 35, the panel 1046 includes multiple apertures 1048 to receive additional dust cap holders. It should be appreciated that the fiber optic assembly of FIG. 35 may be part of an optical module assembly, such as fiber optical module assembly 600, having optic fibers (e.g., pigtails) terminated by the fiber optic connectors 1004.

Further, while the present disclosure generally illustrates SC-type fiber optic connectors, it should be appreciated that a variety of other fiber optic connectors (e.g., LC-type, etc.) may be employed in fiber optic assembles without departing from the scope of this disclosure.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A dust cap for a fiber optic connector, the fiber optic connector including a connector body having a first end and a second end opposite the first end, and a ferrule positioned at the first end of the connector body, the dust cap comprising a housing defining a cavity for receiving the ferrule of the fiber optic connector and a retaining member coupled to an external portion of the housing, the retaining member structured to be disposed adjacent to the second end of the connector body when the ferrule is disposed within the cavity to inhibit removal of the fiber optic connector from the dust cap.

2. The dust cap of claim 1 wherein the retaining member defines a notch configured to straddle at least a portion of the fiber optic connector when the dust cap is releasably engaged to a dust cap holder.

3. The dust cap of claim 1 further comprising a collar coupled to the housing and positioned within the cavity, wherein the collar is configured to contact an inner housing of the fiber optic connector when the ferrule is disposed within the cavity.

4. The dust cap of claim 1 further comprising a mounting member coupled to the housing for releasably engaging a support structure.

5. The dust cap of claim 4 wherein the mounting member is operatively coupled to the retaining member to inhibit removal of the fiber optic connector when the dust cap is releasably engaged to a support structure, and to permit removal of the connector from the dust cap when the dust cap is disengaged from the support structure.

6. The dust cap of claim 5 further comprising a biasing member for biasing the mounting member toward the housing for releasably engaging a support structure therebetween.

7. The dust cap of claim 6 wherein the biasing member is monolithically formed with the housing.

8. A dust cap for a fiber optic connector, the fiber optic connector including a connector body having a first end and a second end, and a ferrule positioned at the first end of the connector body, the dust cap comprising a housing defining a cavity for receiving the ferrule of the fiber optic connector, a mounting member pivotally coupled to an external portion of the housing for releasably engaging a support structure, and a retaining member structured to inhibit removal of the fiber optic connector from the dust cap when the ferrule is disposed within the cavity.

9. The dust cap of claim 8 wherein the mounting member is monolithically formed with the retaining member.

10. A fiber optic assembly comprising the dust cap of claim 8 and a fiber optic connector having a ferrule disposed within the cavity of the dust cap, the fiber optic connector including a connector body having a first end and a second end, the ferrule positioned at the first end.

11. The fiber optic assembly of claim 10 wherein the retaining member is disposed to contact at least one of the second end of the connector body and a boot of the fiber optic connector.

12. The fiber optic assembly of claim 10 further comprising a support structure comprising a dust cap holder, the dust cap releasably engaged to the dust cap holder.

13. The fiber optic assembly of claim 12 wherein the mounting member includes an engagement portion having at least one projection disposed in a depression defined by the dust cap holder.

14. The fiber optic assembly of claim 12 wherein the dust cap holder includes a plurality of tabs structured to releasably engage a support structure.

15. The fiber optic assembly of claim 12 wherein the mounting member is monolithically formed with the retaining member, separate from the housing.

16. The fiber optic assembly of claim 15 wherein the dust cap includes a biasing member to bias the mounting member toward the housing to releasably engage the dust cap holder between the mounting member and the housing.

17. The fiber optic assembly of claim 10 wherein the fiber optic connector includes an inner housing disposed about the ferrule, and the housing includes a collar in contact with the inner housing.

18. A method of managing a fiber optic connector and a dust cap, the fiber optic connector including a connector body having a first end and a second end opposite the first end, and a ferrule positioned at the first end of the connector body, the dust cap having a housing defining a cavity and a retaining member coupled to an external portion of the housing, the method comprising deflecting the retaining member coupled to the external portion of the dust cap housing away from the second end of the connector body of the fiber optic connector and removing the ferrule of the fiber optic connector from the cavity of the dust cap.

19. The method of claim 18 wherein deflecting the retaining member includes disengaging the dust cap from a dust cap holder.

20. The method of claim 18 further comprising releasably coupling a dust cap holder to a support structure when the dust cap is releasably engaged to the dust cap holder.

* * * * *